(12) United States Patent
Sasaki et al.

(10) Patent No.: US 9,033,400 B2
(45) Date of Patent: May 19, 2015

(54) VEHICLE FRONT STRUCTURE

(71) Applicant: HONDA MOTOR CO., LTD., Minato-Ku, Tokyo (JP)

(72) Inventors: Kazutada Sasaki, Wako (JP); Hidefumi Nihei, Wako (JP); Daisuke Naoi, Wako (JP); Masanobu Eguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/369,265

(22) PCT Filed: Oct. 12, 2012

(86) PCT No.: PCT/JP2012/076533
§ 371 (c)(1),
(2) Date: Jun. 27, 2014

(87) PCT Pub. No.: WO2013/105321
PCT Pub. Date: Jul. 18, 2013

(65) Prior Publication Data
US 2014/0367994 A1 Dec. 18, 2014

(30) Foreign Application Priority Data
Jan. 11, 2012 (JP) ................................. 2012-003109

(51) Int. Cl.
*B62D 25/08* (2006.01)
(52) U.S. Cl.
CPC .............. *B62D 25/081* (2013.01); *B62D 25/08* (2013.01); *B62D 25/082* (2013.01); *B62D 25/088* (2013.01)

(58) Field of Classification Search
CPC ............................ B62D 25/081; B62D 25/088
USPC ........................ 296/187.09, 193.09, 208, 192
See application file for complete search history.

(56) References Cited

U.S. PATENT DOCUMENTS

| | | | |
|---|---|---|---|
| 6,633,089 B2 * | 10/2003 | Kimura | 307/10.1 |
| 2005/0067858 A1 * | 3/2005 | Suh et al. | 296/192 |
| 2008/0116721 A1 * | 5/2008 | Shimura | 296/192 |
| 2009/0146455 A1 * | 6/2009 | Honji et al. | 296/187.09 |
| 2013/0229031 A1 * | 9/2013 | Bisror et al. | 296/201 |

FOREIGN PATENT DOCUMENTS

| | | | |
|---|---|---|---|
| EP | 2033879 A1 * | 3/2009 | |
| JP | H03-167081 A | 7/1991 | |
| JP | H09-95261 A | 4/1997 | |
| JP | H11-180343 A | 7/1999 | |

(Continued)

*Primary Examiner* — Jason S Morrow
(74) *Attorney, Agent, or Firm* — Carrier Blackman & Associates, P.C.; Joseph P. Carrier; William D. Blackman

(57) ABSTRACT

The vehicle front structure 100 has a windshield lower 6, a cross member 7 fixed on the windshield lower 6, an upper member 1 extending in a front-back direction of a vehicle, a damper housing 4 fixed inside the upper member 1 in a vehicle width direction and arranged in front the cross member 7, and a damper housing support 5 coupling the cross member 7 with the damper housing 4. A closed section K is formed by the windshield lower 6 and the cross member 7. The damper housing support 5 has a damper housing fixed section 51 which is fixed on an upper surface 41 of the damper housing 4 and a vertical wall section 53 which extends backward from an inside of the damper housing fixed section 51 in the vehicle width direction and is fixed on the cross member 7.

9 Claims, 22 Drawing Sheets

(56) References Cited

FOREIGN PATENT DOCUMENTS

| | | |
|---|---|---|
| JP | 2006-007981 A | 1/2006 |
| JP | 2006-182197 A | 7/2006 |
| JP | 2006-193023 A | 7/2006 |
| JP | 2007-230490 A | 9/2007 |
| JP | 2008-284925 A | 11/2008 |
| JP | 2011-084093 A | 4/2011 |

* cited by examiner

FIG. 9
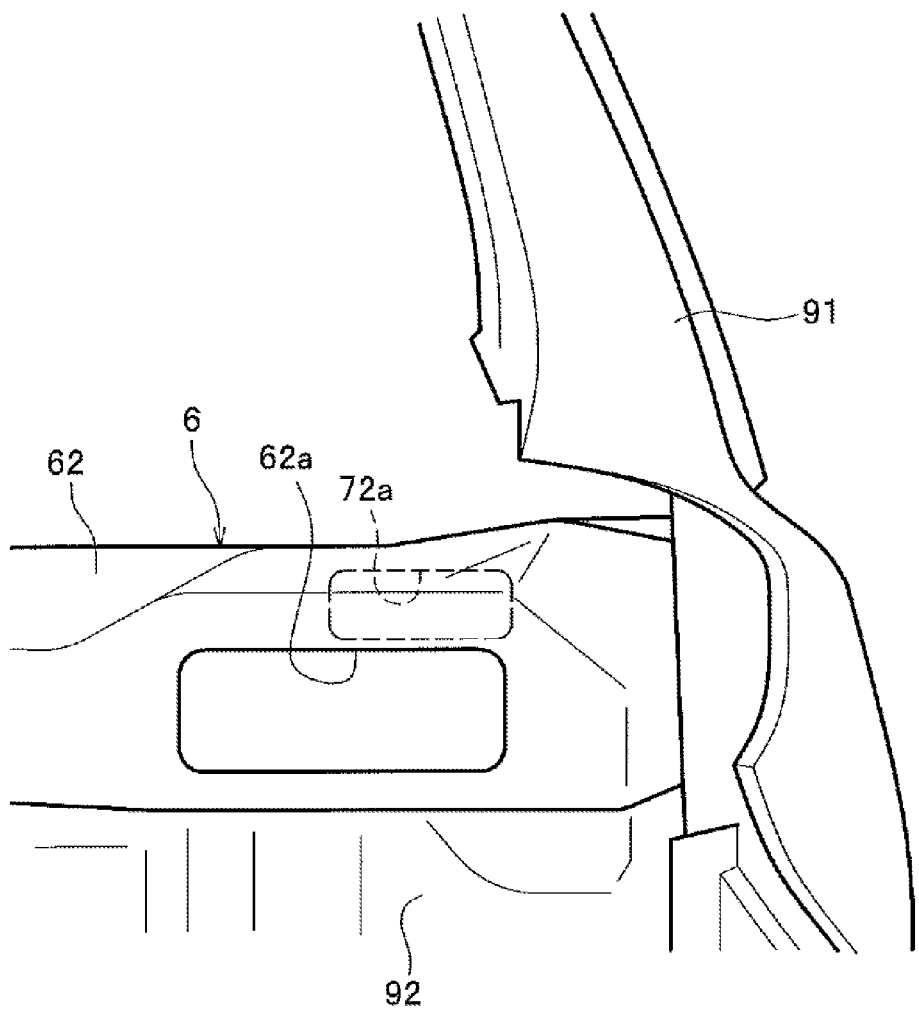
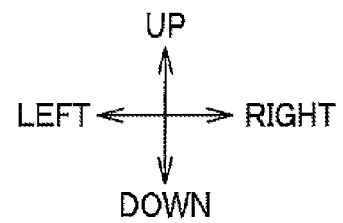

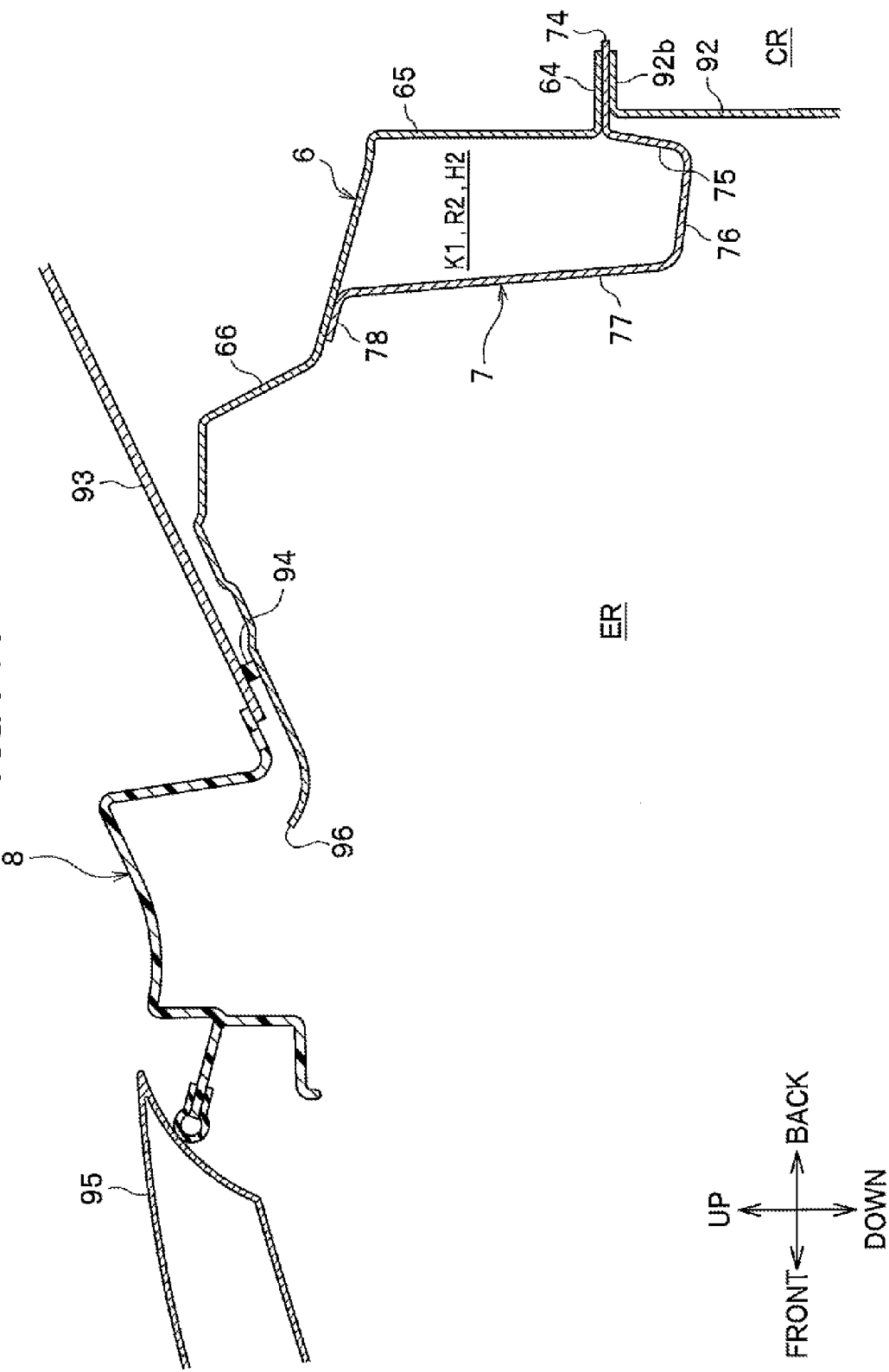

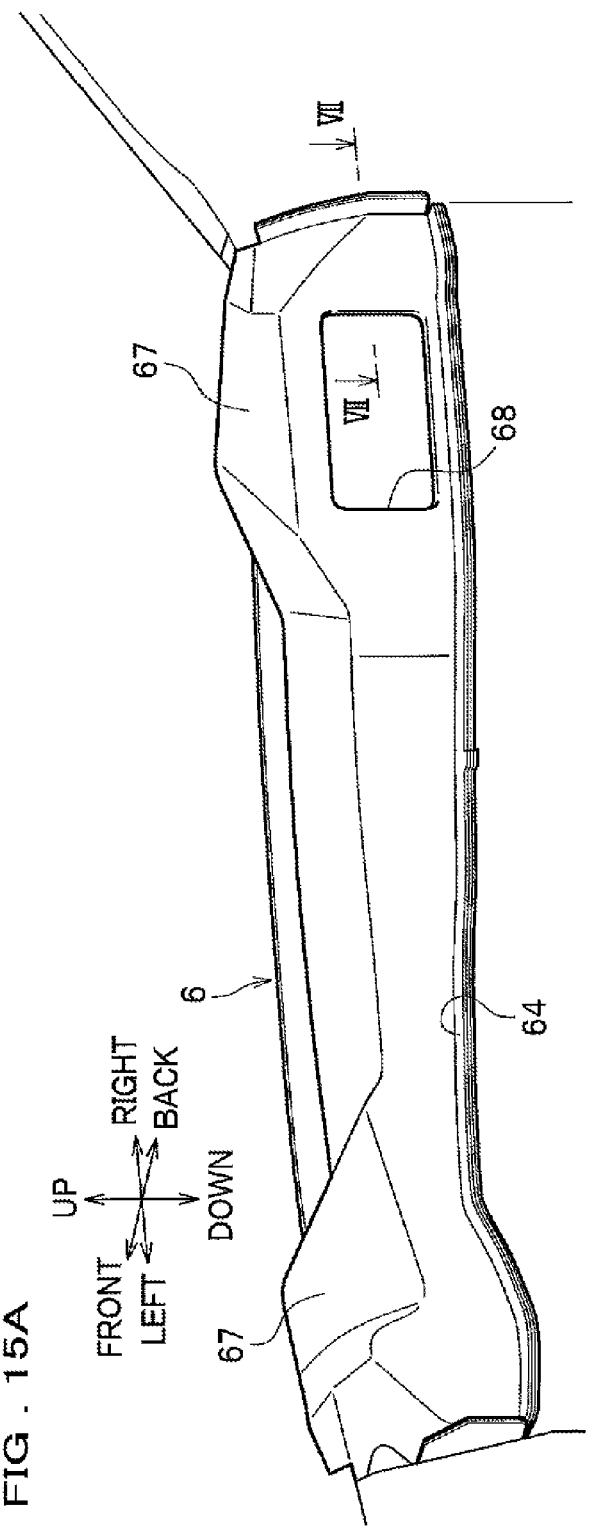
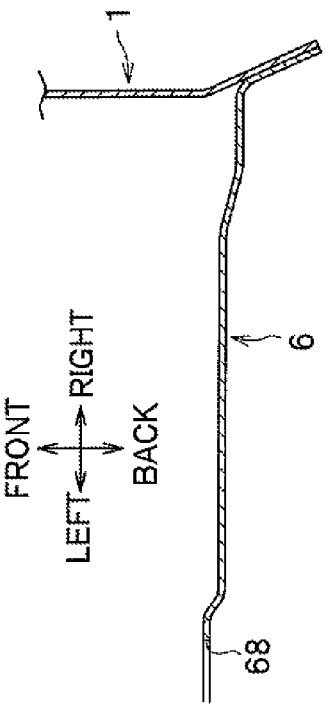
FIG. 15A
FIG. 15B

VEHICLE FRONT STRUCTURE

TECHNICAL FIELD

The invention relates to a vehicle front structure.

BACKGROUND ART

Conventionally, a vehicle front structure has been known in which a collision load generated at a time of front collision is transmitted dispersively.

For example, Patent Literature 1 discloses providing first members between a right and left pair of front side frames extending in a front-back direction of a vehicle and front end parts of a right and left pair of suspension towers arranged outside the front side frames respectively, and transmitting a collision load applied on the front side frames to the suspension towers dispersively via the first members. Patent Literature 1 further discloses providing second members between rear end parts of the suspension towers and a front end part of a cowl box supporting a lower end part of a windshield respectively, and transmitting the collision load transmitted to the suspension towers to the cowl box via the second members.

Still further, Patent Literature 1 discloses disposing a suspension tower bar between both the right and left side suspension towers and providing the first members in an inverted v-shape tapering off toward a front of the vehicle seen in planar view. Accordingly, the suspension towers are displaced in a vehicle width direction at the time of front collision to transmit the collision load along an axial direction of the suspension tower bar. This causes plastic deformation in the suspension tower bar along the axial direction thereof and collision energy is absorbed.

PRIOR ART DOCUMENTS

Patent Literatures

Patent Literature 1: JP2007-230490 A

SUMMARY OF THE INVENTION

Problems to be Solved by the Invention

However, in the invention disclosed in Patent Literature 1, since the second members are provided between the suspension towers and the cowl box, if the suspension towers are displaced in the vehicle width direction, a coupling section side of the second members with suspension towers are displaced in the vehicle width direction with respect to the coupling sections with the cowl box. Thus, there arises problems such that the collision load is difficult to be transmitted from the second members to the cowl box and the second members themselves do not contribute to the absorption of the collision energy.

The present invention is invented from such a point of view and aims to provide a vehicle front structure which is capable of achieving satisfactory shock absorption.

Means to Solve the Problems

To solve the above problems, the invention provides a vehicle front structure comprising: a windshield lower that supports a windshield from underneath; a cross member that is fixed on the windshield lower and extends in a vehicle width direction; an upper member that is fixed on a front end part of a front pillar and extends in a front-back direction of a vehicle; a damper housing that is fixed inside the upper member in the vehicle width direction and is arranged in front of the cross member to attach a damper; and a damper housing support that couples the cross member with the damper housing, wherein the windshield lower and the cross member form a closed section which extends in the vehicle width direction, and the damper housing support has a damper housing fixed section that is fixed on an upper surface of the damper housing, the damper housing support has: a damper housing fixed section that is fixed on an upper surface of the damper housing; the side wall section having a front wall section that extends downward and backward from a rear end part of the damper housing fixed section and extends along a rear end part of the damper housing, and a bottom wall section that continues to the front wall section and inclines to position downward as extending outside in the vehicle width direction to be fixed on the cross member; and a vertical wall section that extends backward from an inside of the damper housing fixed section in the vehicle width direction and continues to an inside of the side wall section in the vehicle width direction to be fixed on the cross member, the side wall section, the vertical wall section and the cross member form a drain that extends outside in the vehicle width direction from the vertical wall section, the vertical wall section is fixed outside the cross member in the vehicle width direction and functions as cutoff section that prevents in-flow water in the drain from flowing inside in the vehicle width direction, the vertical wall section and the bottom wall section form an approximately L-shaped cross section that extends linearly from the damper housing fixed section to the cross member, the cross member has an outside air inlet port through which outside air passes behind the damper housing support, the windshield lower has a blower inlet port that is coupled with a blower, and an outside air introduction passage that extends in the front-back direction to introduce the outside air is formed above the damper housing support.

Further, to solve the above problems, the invention provides a vehicle front structure comprising: a windshield lower that supports a windshield from underneath; a cross member that is fixed on the windshield lower and extends in a vehicle width direction; an upper member that is fixed on a front end part of a front pillar and extends in a front-back direction of a vehicle; a damper housing that is fixed inside the upper member in the vehicle width direction and is arranged in front of the cross member to attach a damper; and a damper housing support that couples the cross member with the damper housing, wherein the windshield lower and the cross member form a closed section, the damper housing support has: a damper housing fixed section that is fixed on an upper surface of the damper housing; and a vertical wall section that extends backward from an inside of the damper housing fixed section in the vehicle width direction and is fixed on the cross member, the damper housing support is arranged at both right and left side, a right and left pair of outside air introduction passages that extend in the front-back direction to introduce outside air are formed above the damper housing support, and the closed section lets the right and left pair of outside introduction passages communicate.

Still further, to solve the above problems, the invention provides a vehicle front structure comprising: a windshield lower that supports a windshield from underneath; a cross member that is fixed on the windshield lower and extends in a vehicle width direction; an upper member that is fixed on a front end part of a front pillar and extends in a front-back direction of a vehicle; a damper housing that is fixed inside the upper member in the vehicle width direction and is arranged in front of the cross member to attach a damper; and a damper housing support that couples the cross member with the damper housing, wherein the windshield lower and the cross member form a closed section, the damper housing support has: a damper housing fixed section that is fixed on an upper surface of the damper housing; and a vertical wall section that extends backward from an inside of the damper housing fixed section in the vehicle width direction and is fixed on the cross member, a bulged section that bulges upward with respect to a center in the vehicle width direction is formed at both ends of the windshield lower in the vehicle width direction, a right and left pair of reinforcement members are further provided, which are provided at both ends of the cross member in the vehicle width direction and are arranged between the bulged section of the windshield lower and the cross member, the cross member and the windshield lower form a central closed section that extends at a central side in the vehicle width direction, the cross member, the reinforcement member and the bulged section of the windshield lower form an end closed section that extends at both end sides in the vehicle width direction; and the central closed section and the end closed section communicate to each other.

According to the invention, the damper housing is fixed inside the upper member in the vehicle width direction and is coupled with the cross member via the damper housing support. Therefore, a collision load applied on the upper member at a time of front collision is transmitted dispersively to the cross member via the damper housing and the damper housing support. Further, since the cross member forms the closed section with the windshield lower, the collision load transmitted to the cross member is also transmitted to the windshield lower.

Further, according to the invention, the vertical wall section of the damper housing support extends backward from the inside of the damper housing fixed section in the vehicle width direction to be fixed on the cross member. Therefore, if the damper housing moves backward at the time of front collision, the collision load along the front-back direction of the vehicle is transmitted to the vertical wall section. This causes the vertical wall section to be crushed, thereby collision energy can be absorbed and the collision load can be transmitted over the cross member by the vertical wall section.

Still further, according to the invention, the damper housing is fixed on the upper member and is coupled with the cross member forming the closed section with the windshield lower via the damper housing support. Therefore, support rigidity of the damper housing enhances, and, improvement of ride quality, operation stability, and restraint of vehicle oscillation can be achieved.

Moreover, according to the invention, since the windshield lower and the cross member form the closed section, a dashboard upper having a large section size is not needed and a compartment space can be expanded.

Since the outside air introduction passages which introduce the outside air are formed above the damper housing support, there is no member projecting to an engine room side at the central side of the cross member in the vehicle width direction. Therefore, an engine hood can be positioned lower and front visibility of the vehicle can be enhanced. Further, since the outside air is introduced from both the right and left sides, outside air introduction amount can be sufficiently kept by expanding an outside air introduction passage.

Further, the bulged section that bulges upward with respect to the center in the vehicle width direction is formed at both the ends of the windshield lower in the vehicle width direction, reinforcement members are arranged between the bulged section of the windshield lower and the cross member. Therefore, an arrangement space for a wiper device can be reserved between the bulged section of the windshield lower and the reinforcement members.

Further, the vertical wall section preferably extends linearly from an inside of the damper housing fixed section in the vehicle width direction to the cross member and inclines to position at the inside in the vehicle width direction as extending backward from a front.

According to the structure, the vertical wall section extends linearly from the inside of the damper housing fixed section in the vehicle width direction to the cross member and inclines to position at the inside in the vehicle width direction as extending backward from the front. Therefore, the load applied on an upper part of the damper housing in the front-back direction and the right-left direction at a time of driving and turning is transmitted to the cross member via the vertical wall section. This leads to higher support rigidity of the damper housing and improves the operation stability.

Further, preferably, the front end side of the windshield lower positions above the damper housing support, a cowl top is further provided, which is arranged above the damper housing support to cover an opening formed between the windshield lower and an engine hood, and which has an outside air introduction port through which the outside air is introduced, a covering member is further provided, which seals between the damper housing support, the windshield lower and the cowl top, and the cowl top, and the damper housing support, the windshield lower, the covering member and the upper member form the outside air introduction passage.

According to the structure, since the outside air introduction passage is formed by the cowl top, the damper housing support, the windshield lower, the covering member and the upper member, front-back length of the outside air introduction passage can be elongated and a width size of the outside air introduction passage can be expanded. Thus, in-flow water from the outside air introduction port of the cowl top drops on the damper housing support and the cross member to be drained on the way to the outside air introduction passage. Therefore, gas-liquid separation is improved and power consumption of a blower (air conditioner) can be reduced by keeping the outside air introduction amount sufficiently.

Further, preferably, the cowl top has a first opening that is provided at both the ends in the vehicle width direction and faces the upper surface of the damper housing and a damper attachment lid that closes the first opening and is detachably provided on the first opening, and the damper attachment lid has a second opening that faces the upper surface of the damper housing.

According to the structure, the cowl top has the first opening that is provided at both the ends in the vehicle width direction and faces the upper surface of the damper housing and the damper attachment lid that closes the first opening and is detachably provided on the first opening, and the damper attachment lid has the second opening that faces the upper surface of the damper housing. Therefore, the outside air can be introduced through the second opening in addition to the outside air introduction port, and the outside air introduction amount can be increased. Further, a removing/attaching operation for a damper and a maintenance operation can be performed easily by detaching the damper attachment lid from the cowl top.

Further, a wiper device is preferably arranged in the outside air introduction passage.

According to the structure, since the wiper device is arranged in the outside air introduction passage, in-flow water in the outside air introduction passage hits on the wiper device while the outside air flows to circumvent the wiper device. Thus, water flow to the blower can be restrained and decrease of the outside air introduction amount can be prevented.

Further, the damper housing support and the cross member are preferably arranged under the wiper device.

According to the structure, since the damper housing support and the cross member are arranged under the wiper device, the water hit on the wiper device is drained outside the vehicle via the damper housing support and the cross member.

Further, preferably, a dashboard lower that separates an engine room from a compartment is provided, wherein the windshield lower is fixed on an upper end part of the dashboard lower and extends forward from the upper end part of the dashboard lower to support the windshield in a cantilever structure, the cross member is fixed on the dashboard lower side of the windshield lower, a brake master cylinder is attached in the dashboard lower, the cross member has a bottom wall section and is arranged above the brake master cylinder, and the bottom wall section has a runoff that projects upward at a corresponding position to the brake master cylinder in an up-down direction, and a right and left pair of inclined planes that incline to position downward as extending from the runoff to an outside in the vehicle width direction.

According to the structure, the windshield lower extends forward from the upper end part of the dashboard lower to support the windshield in the cantilever structure, and forms the closed section with the cross member at the dashboard lower side of the windshield to improve the support rigidity at the base end side of the windshield lower. Therefore, the front end side of the windshield lower is easily bent due to the load from above and the load from above can be absorbed favorably.

Further, according to the structure, the bottom wall section of the cross member has the runoff which projects upward at the corresponding position to the brake master cylinder in the up-down direction. Therefore, the cross member can be arranged downward to bring close to the brake master cylinder compared with the bottom wall section formed flat, and the engine hood can be positioned lower accordingly. Further, the bottom wall section of the cross member has the right and left pair of the inclined planes which incline so as to position downward as extending from the runoff to the outside in the vehicle width direction. Therefore, the water on the bottom wall section of the cross member is easily drained to the side section of the vehicle by self-weight.

Effect of the Invention

The invention can provide a vehicle front structure which is capable of achieving satisfactory impact absorption.

BRIEF DESCRIPTION OF THE DRAWINGS

FIG. 9 is a rear view of the vehicle front structure;

FIG. 14 is an end view along IV-IV line in FIG. 12;

FIG. 15A is a perspective view where the windshield lower is seen down from a diagonally rear side, and FIG. 15B is an end view along VII-VII line in FIG. 15A;

EMBODIMENTS FOR CARRYING OUT THE INVENTION

A first embodiment of the invention will be explained in detail with reference to FIGS. 1 to 10. In the explanations, a same element is labeled with a same numeral and redundant explanations will be omitted.

Further, in the explanations, when a direction is indicated, front-back, right-left, and up-down directions of a vehicle V will be used as references. A "vehicle width direction" and a "right and left direction" have a same meaning.

Figure 1:
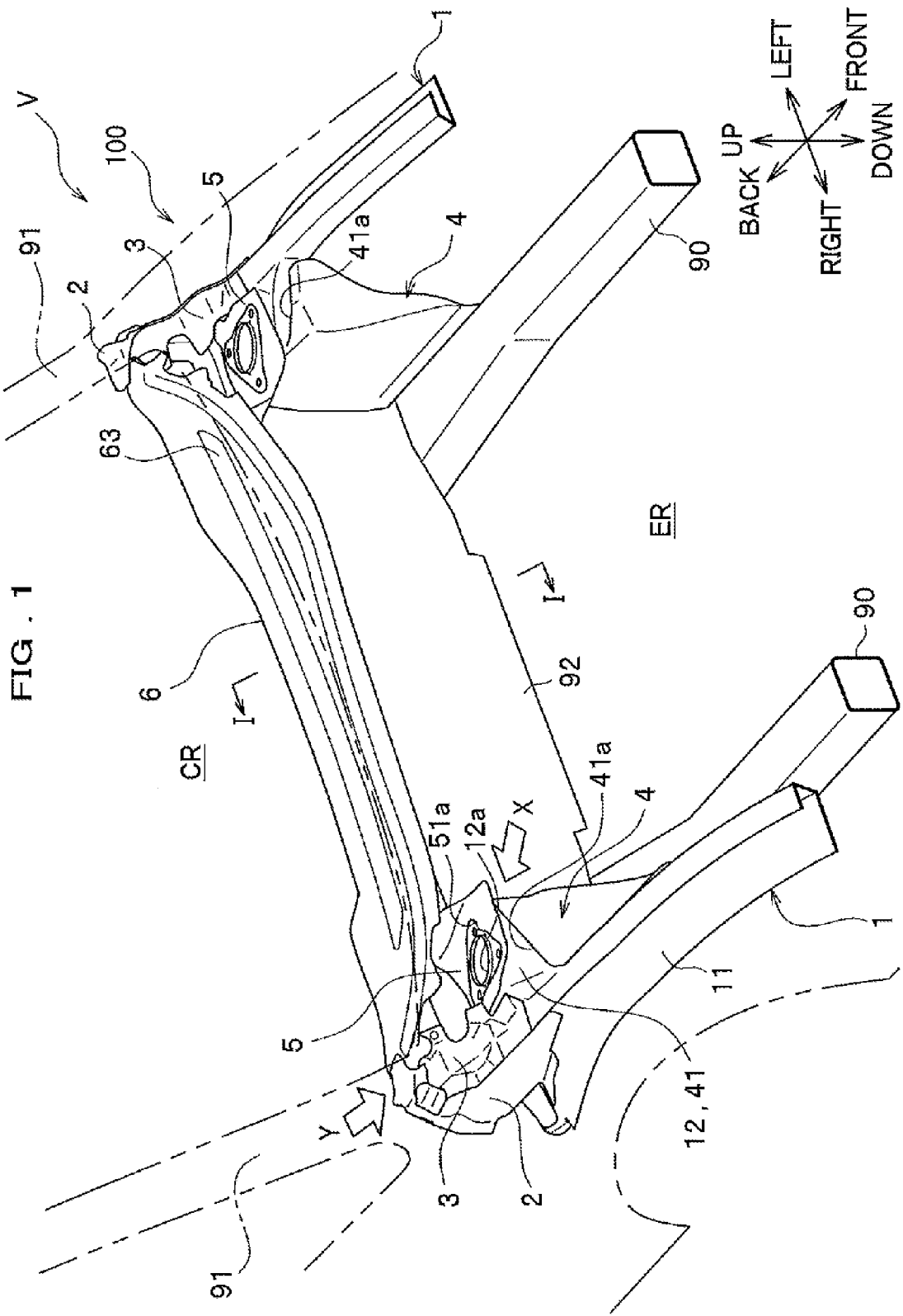
FIG. 1 is a schematic general perspective view of a vehicle front structure according to a first embodiment of the invention.
Figure 2:
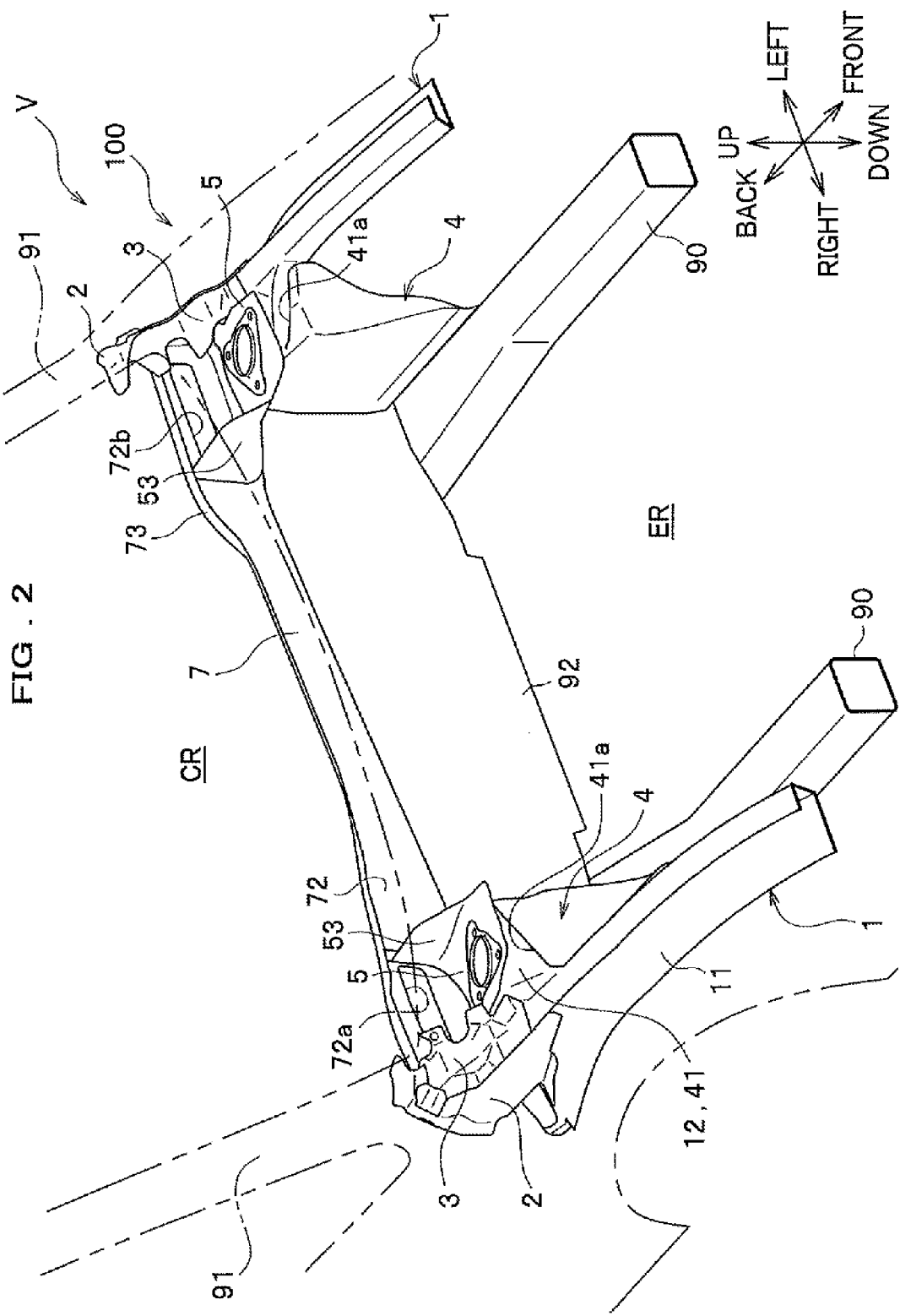
FIG. 2 is a schematic general perspective view of the vehicle front structure without a windshield lower.
Figure 3:
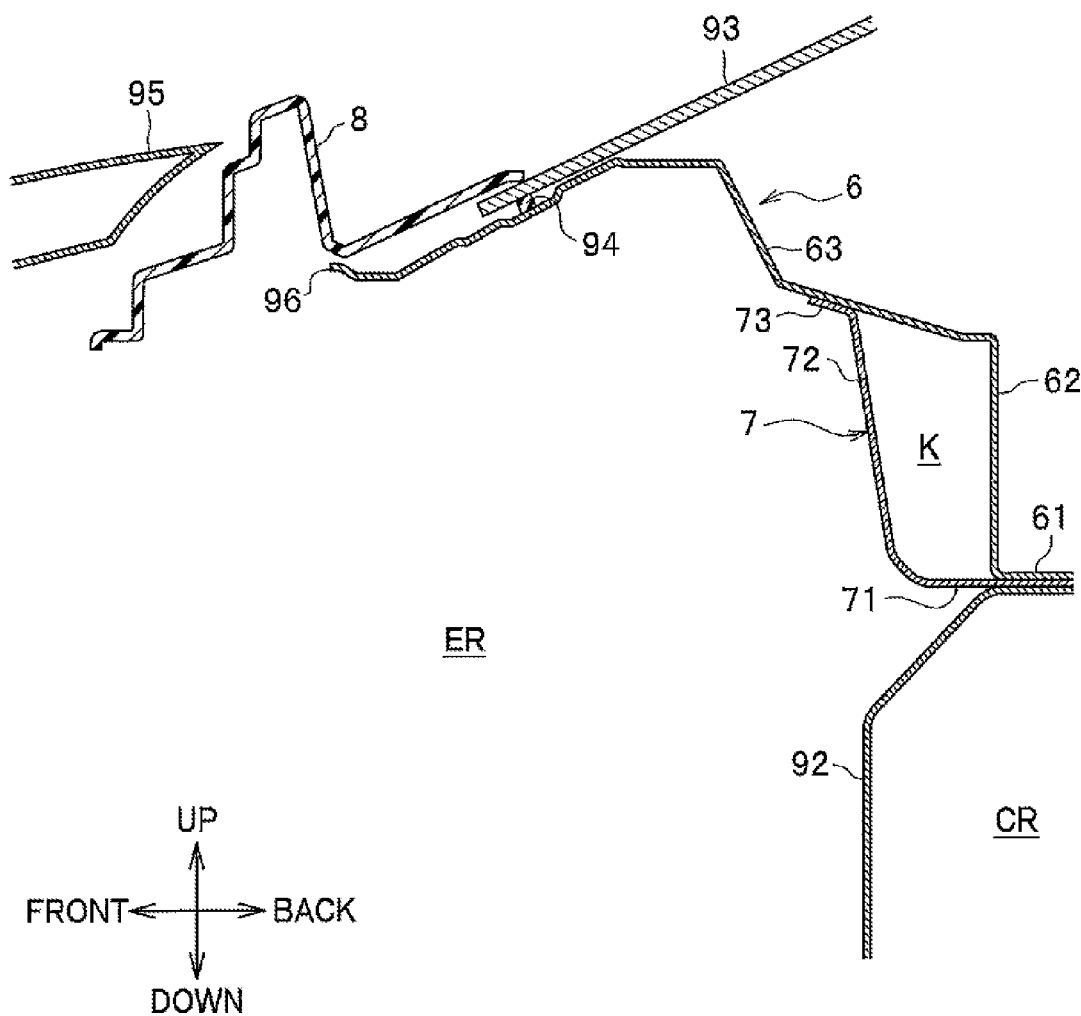
FIG. 3 is an end view along I-I line in FIG. 1.

As illustrated in FIGS. 1 to 3, a vehicle front structure 100 according to the first embodiment of the invention mainly has upper members 1, 1, side extensions 2, 2, side members 3, 3, damper housings 4, 4, damper housing supports 5, 5, a windshield lower 6, a cross member 7 (see FIG. 2), and a cowl top 8 (see FIG. 3).

<Upper Member>

As illustrated in FIG. 1, the upper member 1 is a steel member which is arranged at both right and left sides of the vehicle V and extends along the front-back direction. The upper member 1 has an approximately U-shaped main body section 11 which opens outside in the vehicle width direction, and a fixed section 12 which extends from an inside at a rear of the main body section 11 in the vehicle width direction to a damper housing 4 and is fixed to an upper end part of the damper housing 4.

A front end side of the main body section 11 is fixed on a front side frame 90 arranged diagonally downward of the main body section 11 and extending along the front-back direction via a coupling section (not illustrated). A rear end side of the main body section 11 is fixed on a frond end of a front pillar 91. A portion (tip side) of the fixed section 12 exposes from a bore 51a in an approximately triangular shape formed in the damper housing support 5 described later. At the exposed portion, a round-shaped bore 12a is formed. The bore 12a is closed by a cap member (not illustrated). Further, a bumper beam extension, a front bumper beam and the like (not illustrated) are provided at a front end of the front side frame 90.

<Side Extension>

As illustrated in FIG. 1, the side extension 2 is a steel member which is arranged at both the right and left sides of the vehicle V and is fixed at a rear end side of the upper member 1. A rear end of the side extension 2 is fixed on the front end of the front pillar 91.

<Side Member>

As illustrated in FIG. 1, the side member 3 is a steel member which is arranged at both the right and left sides of the vehicle V and transmits a collision load applied on the upper member 1 at a time of front collision to the front pillar 91. A front end side of the side member 3 is fixed on the main body section 11 and the fixed section 12 of the upper member 1, and a rear end side thereof is fixed on an upper end part of the side extension 2.

<Damper Housing>

Figure 6:
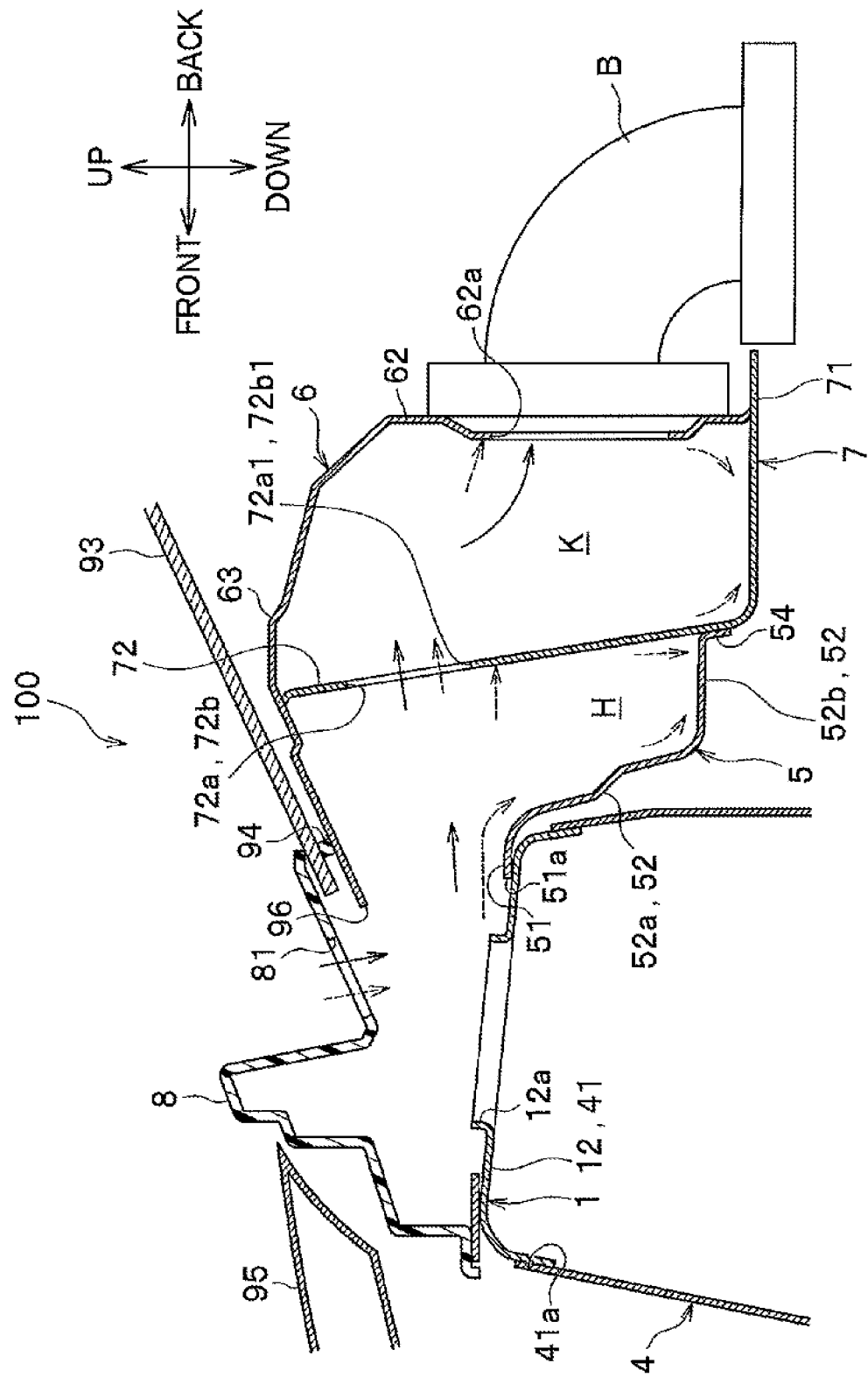
FIG. 6 is an end view along II-II line in FIG. 5.

As illustrated in FIG. 1, the damper housing 4 is a steel member which is arranged at both the right and left sides of the vehicle V and accommodates to support the damper (not illustrated) therein. As illustrated in FIG. 2, the damper housing 4 is arranged inside in the vehicle width direction at the rear end side of the upper member 1, and is arranged in front of both right and left ends of the cross member 7. An outer end part of the damper housing 4 is fixed inside the main body section 11 of the upper member 1 in the vehicle width direction, and a lower end part thereof is fixed on the front side frame 90. As illustrated in FIG. 6, a bore 41a is formed in an upper surface 41 of the damper housing 4, through which an upper end part of the damper is exposed outside. The fixed section 12 of the upper member 1 is provided to cover the bore 41a from above. In the embodiment, the fixed section 12 of the upper member 1 constitutes the upper surface 41 of the damper housing 4.

<Damper Housing Support>

Figure 4:
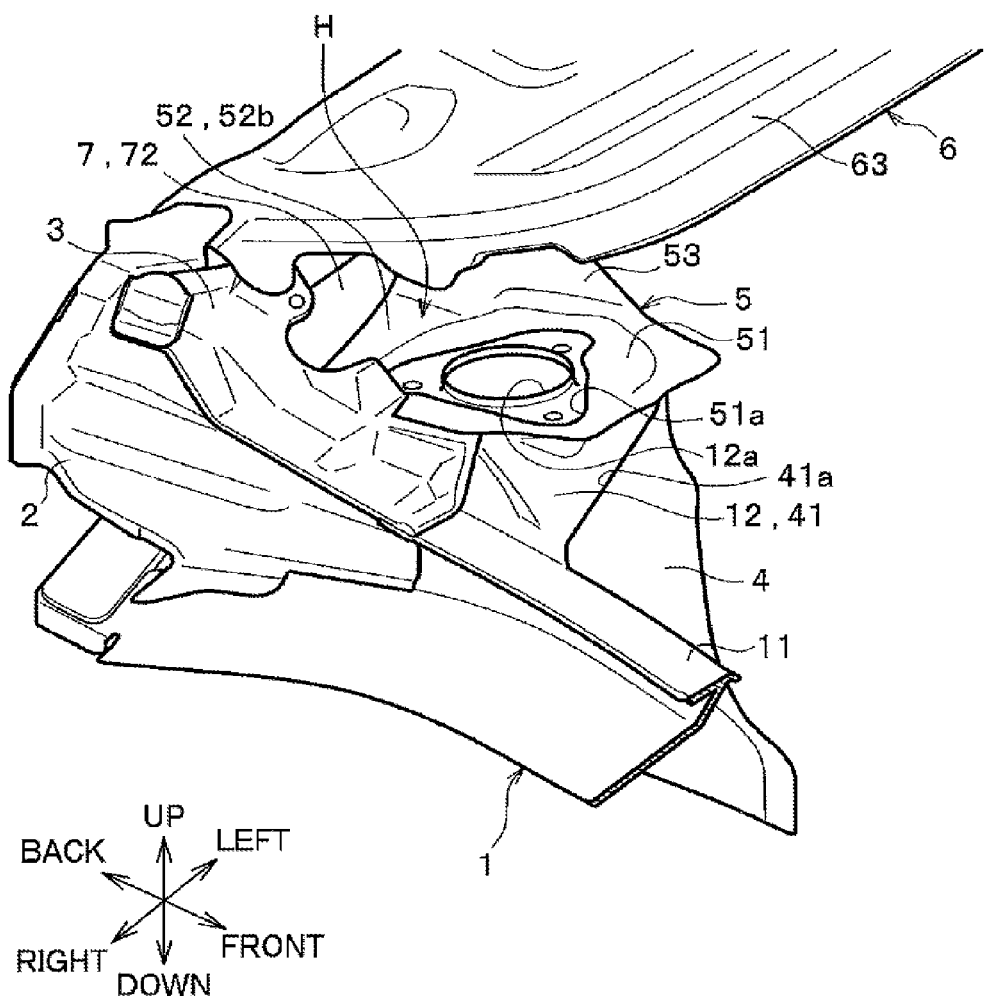
FIG. 4 is a partially enlarged perspective view of FIG. 1.

As illustrated in FIG. 2, the damper housing support 5 is a steel member which is arranged at both the left and the right sides of the vehicle V and couples the damper housing 4 and the cross member 7. As illustrated in FIG. 4, the damper housing support 5 has a damper housing fixed section 51, a side wall section 52 and a vertical wall section 53.

As illustrated in FIG. 6, the damper housing fixed section 51 is a section which is fixed on the upper surface 41 of the damper housing 4. As illustrated in FIGS. 4 and 6, a bore 51a is formed in the damper housing fixed section 51, through which the portion of the fixed section 12 of the upper member 1 is exposed.

In the embodiment, the upper surface 41 of the damper housing 4 and the upper surface of the damper housing fixed section 51 constitute a flow orientation surface on which outside air (air) from an outside air introduction port 81 of a cowl top 8 described later flows.

Figure 7:
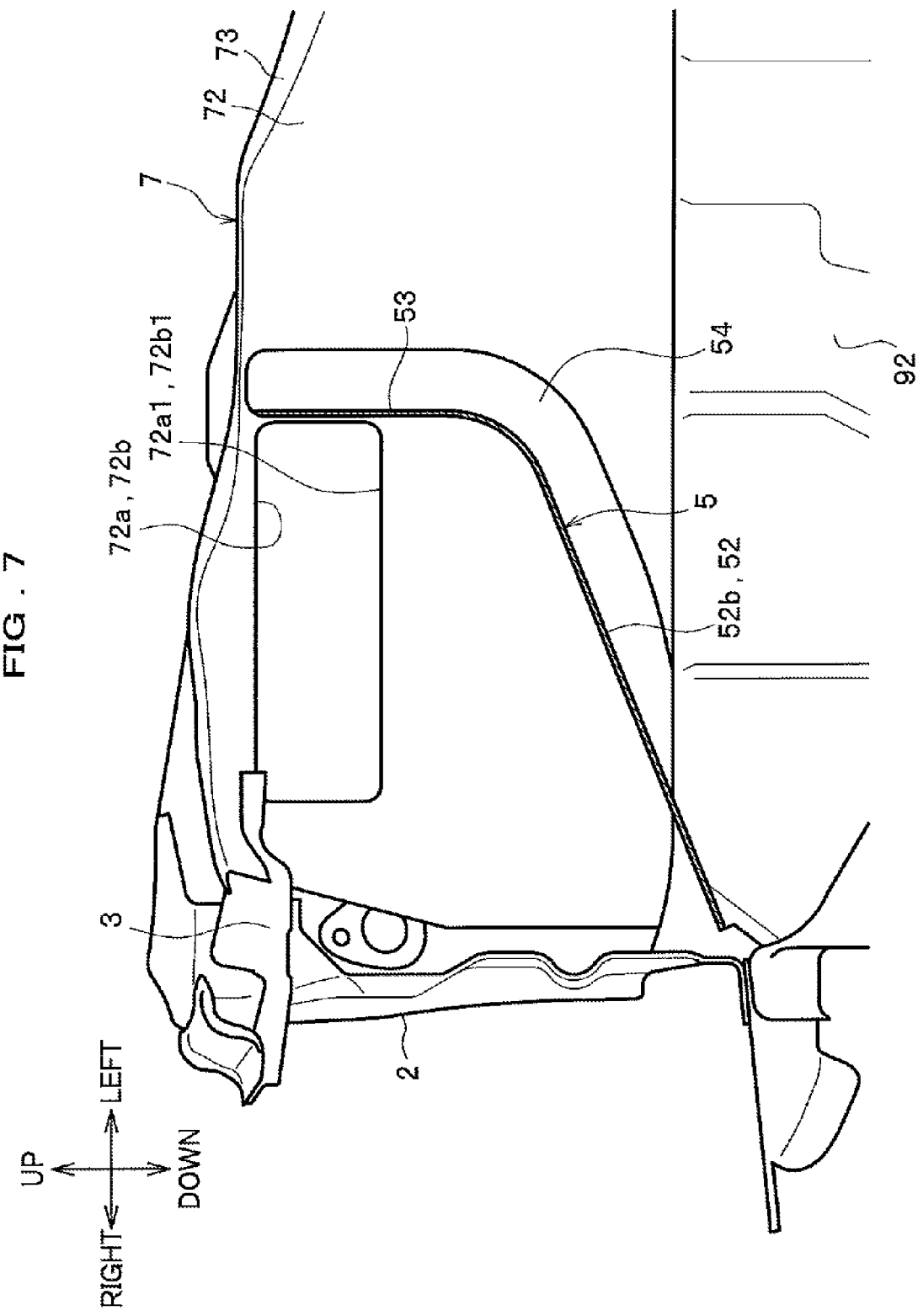
FIG. 7 is an end view along III-III line in FIG. 5.

As illustrated in FIG. 6, the side wall section 52 is a section which extends downward and backward from a rear end part of the damper housing fixed section 51, and is fixed on a vertical wall section 72 of the cross member 7. The side wall section 52 extends along a rear end part of the damper housing 4 at a rear upper side of the rear end part. The side wall section 52 has a slope section 52a extending inclininigly so as to position downward as extending backward from the rear end part of the damper housing fixed section 51, and a bottom wall section 52b extending backward from a rear end part of the slope section 52a and fixed on the cross member 7. In the embodiment, the slope section 52a, the bottom wall section 52b and the vertical wall section 72 of the cross member 7 form a drain H in the right-left direction, and the drain H has a concave-shape seen in cross section. As illustrated in FIG. 7, the bottom wall section 52b inclines to position downward as extending outside in the vehicle width direction.

Figure 5:
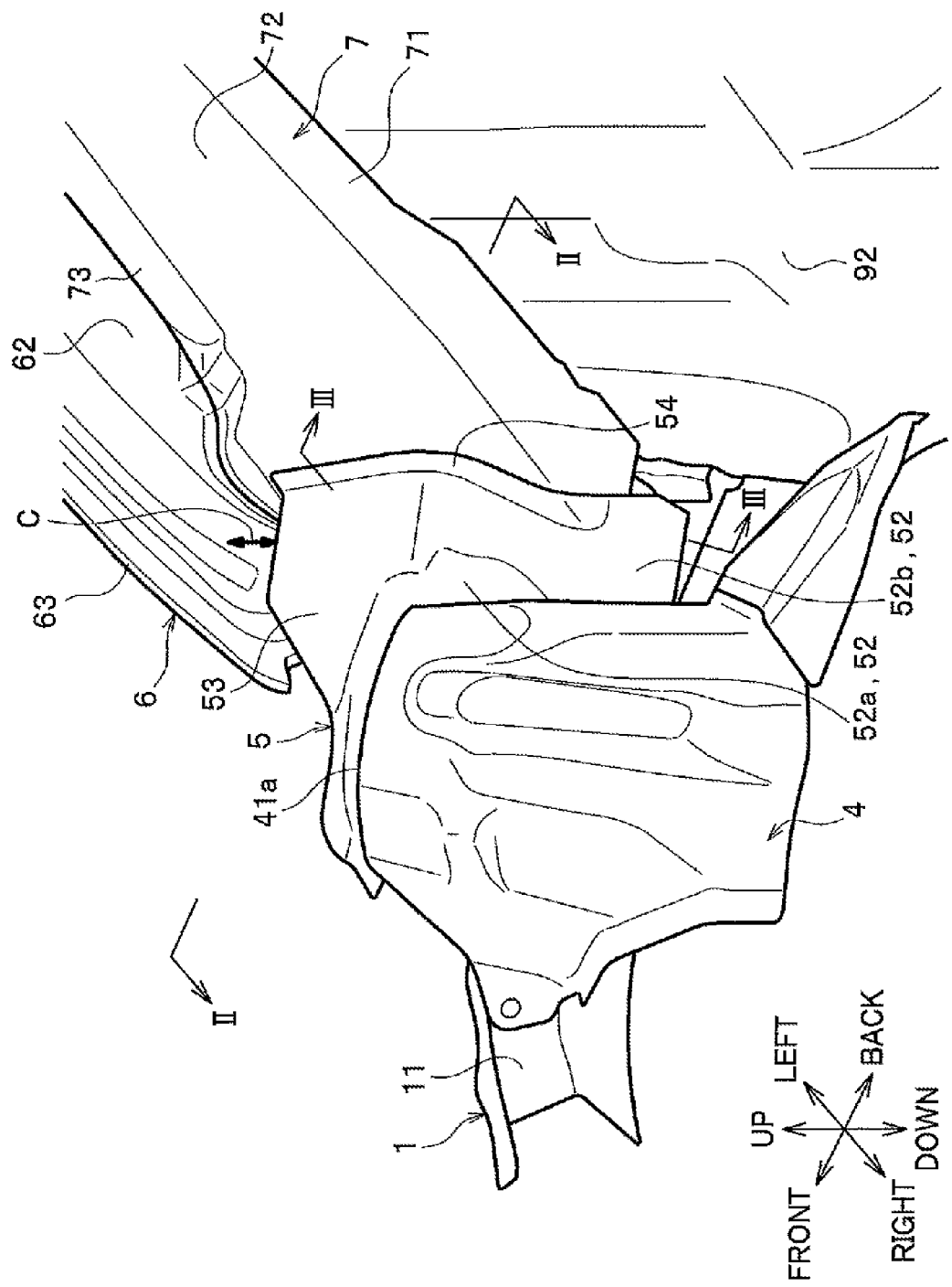
FIG. 5 is a partially enlarged perspective view seen from an arrow X direction illustrated in FIG. 1.

As illustrated in FIGS. 4 and 5, the vertical wall section 53 is a section which extends upward and backward from an inside of the damper housing fixed portion 51 in the vehicle width direction, and is fixed on the vertical wall section 72 of the cross member 7. The vertical wall section 53 is continuously formed inside the side wall section 52 in the vehicle width direction and closes inside the drain H in the vehicle width direction. In other words, the vertical wall section 53 functions as cutoff section which prevents in-flow water in the drain H from flowing inside in the vehicle width direction. As illustrated in FIGS. 5 and 7, a flange section 54 is formed extendingly to be fixed on the cross member 7 at a rear end parts of the bottom wall section 52b and the vertical wall section 53. The flange section 54 extends from an upper end part of the vertical wall section 53 to a right end part and the vicinity of the bottom wall section 52b in a direction perpendicular to the bottom wall section 52b and the vertical wall section 53 (the up-down direction and the right-left direction).

In the embodiment, the side wall section 52 and the vertical wall section 53 serves to drain the water flowing from the outside of the vehicle V to a side thereof by cooperating with the vertical wall section 72 of the cross member 7. Further, the side wall section 52 and the vertical wall section 53 form an approximately box-like structure (bag structure), thereby rigidity of the damper housing support 5 in the front-back direction and the up-down direction is improved. In the embodiment, the damper housing 4 and the cross member 7 as rigid bodies are coupled by the side wall section 52 and the vertical wall section 53 to form a highly rigid body at a front of the vehicle. Thus, a collision load applied on the upper member 1 at the time of front collision can be smoothly transmitted to the damper housing 4, the damper housing support 5, the cross member 7 and the windshield lower 6. Therefore, the collision energy can be absorbed favorably and load burden applied on the side extension 2 and the side member 3 can be reduced.

<Windshield Lower>

As illustrated in FIG. 3, the windshield lower 6 is a long steel member in the right-left direction which is fixed on an upper end part of a dashboard lower 92 partitioning an engine room ER from a compartment CR and which extends forward from the upper end part to support a windshield 93 in a cantilever structure. The windshield lower 6 has a flange section 61 which extends in the front-back direction to be fixed on the dashboard lower 92, a vertical wall section 62 which extends upward from a front end of the flange section 61, and a side wall section 63 which extends forward from an upper end part of the vertical wall section 62 to support a lower end part of the windshield 93.

Figure 8:
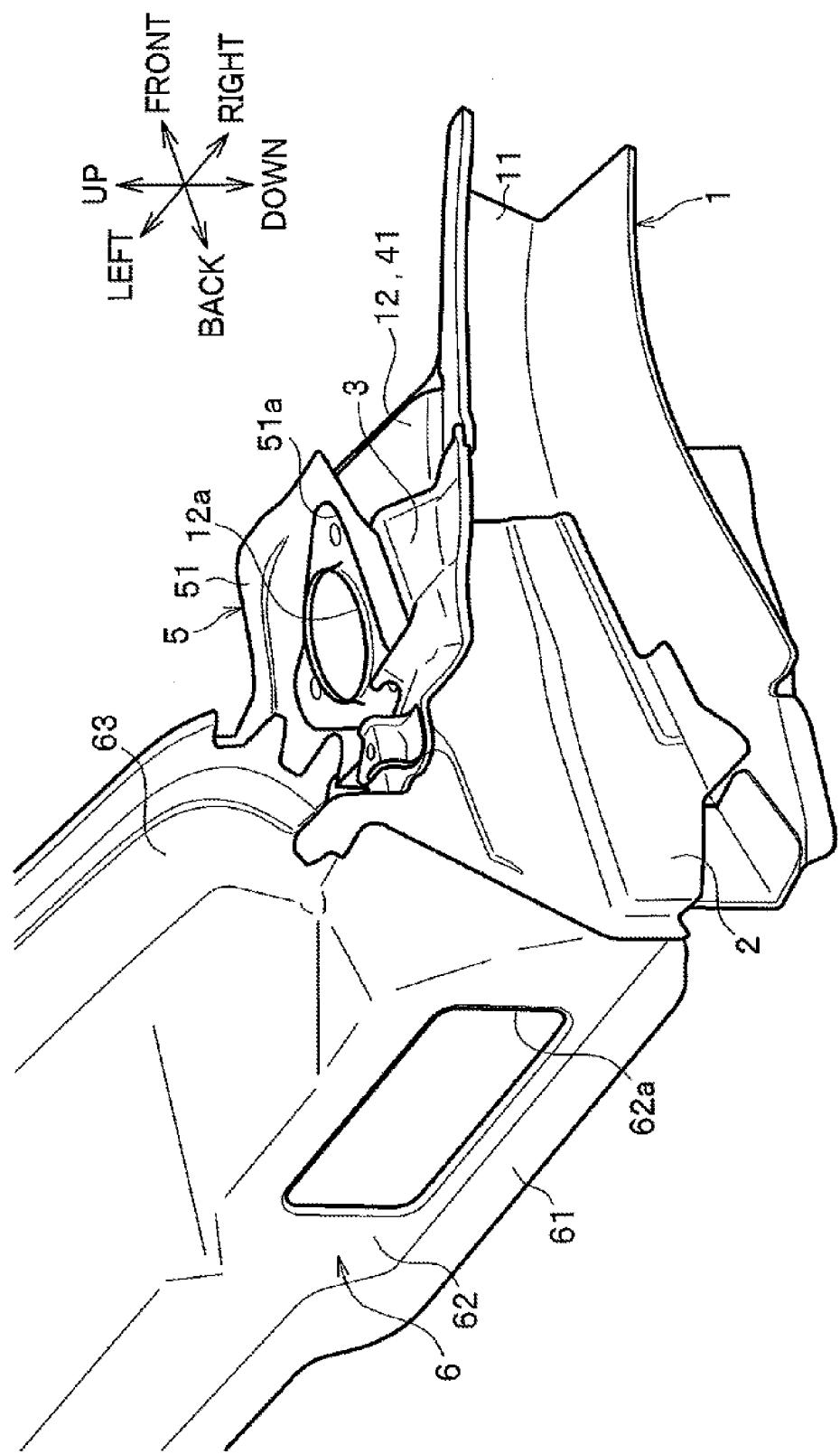
FIG. 8 is a partially enlarged perspective view seen from an arrow Y direction illustrated in FIG. 1.

The vertical wall section 62 is a section which is arranged backward from the vertical wall section 72 of the cross member 7 at a predetermined interval. As illustrated in FIG. 8, a blower inlet port 62a in an approximately rectangular shape opens at a right end part side of the vertical wall section 62. As illustrated in FIG. 6, a blower B which supplies the outside air to the compartment CR (see FIG. 3) is coupled at a rear side of the blower inlet port 62a.

As illustrated in FIG. 6, both right and left ends of the side wall section 63 position above the damper housing support 5.

The side wall section 63 and the windshield 93 are mutually fixed with an adhesive 94. Further, as illustrated in FIG. 5, a predetermined gap C is formed between a front end side of the side wall section 63 and the upper end part of the vertical wall section 53.

<Cross Member>

As illustrated in FIG. 2, the cross member 7 is a long steel member in the right-left direction which extends along the vehicle width direction and is arranged between the front pillars 91, 91 at both right and left sides via the side extension 2. As illustrated in FIG. 3, the cross member 7 is fixed on a base end side (rear end side) of the windshield lower 6 to form a closed section K with the windshield lower 6. Thus, support rigidity at the base end side of the windshield lower 6 is enhanced. The cross member 7 has a lower flange section 71 of which the rear end side is fixed on the upper end part of the dashboard lower 92 and the side wall section 63 of the windshield lower 6, the vertical wall section 72 which extends upward from a front end of the lower flange section 71, and an upper flange section 73 which extends forward from an upper end of the vertical wall section 72 and is fixed on a rear end side of the side wall section 63.

As illustrated in FIGS. 3 and 6, the vertical wall section 72 is a section which is formed such that an up-down size at both the right and left end sides is larger than an up-down size at a central side in the vehicle width direction. As illustrated in FIGS. 2 and 6, both right and left ends of the vertical wall section 72 face the side wall section 52 and the vertical wall section 53 of the damper housing support 5. A pair of outside air inlet ports 72a, 72b in an approximately rectangular shape open for passing the outside air at both right and left end sides of the vertical wall section 72. As illustrated in FIG. 6, lower ends 72a1, 72b1 of the outside air inlet ports 72a, 72b position above the upper surface 41 of the damper housing 4 and the upper surface of the damper housing fixed section 51. As illustrated in FIG. 7, the outside air inlet ports 72a, 72b position outside the vertical wall section 53 of the damper housing support 5 in the vehicle width direction.

<Blower Inlet Port, Outside Air Inlet Port>

Referring to FIGS. 6 and 9, a relationship between the blower inlet port 62a and the outside air inlet port 72a will be explained.

As illustrated in FIGS. 6 and 9, in the embodiment, the blower inlet port 62a is provided at a position corresponding to the right outside air inlet port 72a. In other words, the blower inlet port 62a is provided to deviate to a right region with respect to a center line along the front-back direction passing through a center of the cross member 7 in the vehicle width direction. The blower inlet port 62a positions below the outside air inlet port 72a. In the embodiment, since the oblong closed section K is formed by the windshield lower 6 and the cross member 7, up and down positions of the blower inlet port 62a and the outside air inlet port 72a can be shifted.

Further, the blower inlet port 62a is provided at a position where the outside air inlet port 72a does not overlap the blower inlet port 62a seen from the front-back direction of the vehicle. In other words, the blower inlet port 62a is provided at the position where the outside air inlet port 72a does not overlap the blower inlet port 62a when the blower inlet port 62a is projected on the vertical wall section 72 of the cross member 7. In the embodiment, the closed section K is formed in an oblong shape seen in vertical cross section, and functions as inlet passage through which the pair of right and left outside air inlet ports 72a, 72a communicate with the blower inlet port 62a.

<Cowl Top>

As illustrated in FIG. 6, the cowl top 8 is a resin member which covers an opening 96 formed between the windshield lower 6 and a engine hood 95. The cowl top 8 is fixed on the windshield lower 6 to form, as it is called, a cowl box with the windshield lower 6. The outside air introduction port 81 which introduces the outside air from the outside of the vehicle V is formed through both right and left end sides of the cowl top 8.

The vehicle front structure 100 according to the first embodiment of the invention is basically structured as described above and effects thereof will be explained below.

According to the embodiment, since the damper housing 4 is fixed inside the upper member 1 in the vehicle width direction and is coupled with the cross member 7 via the damper housing support 5, the collision load applied on the upper member 1 via the front side frame 90 at the time of front collision (especially at the time of offset collision) is dispersively transmitted to the cross member 7 via the damper housing 4 and the damper housing support 5. Further, since the cross member 7 forms the closed section K with the windshield lower 6, the collision load transmitted to the cross member 7 is also transmitted to the windshield lower 6.

Figure 10:
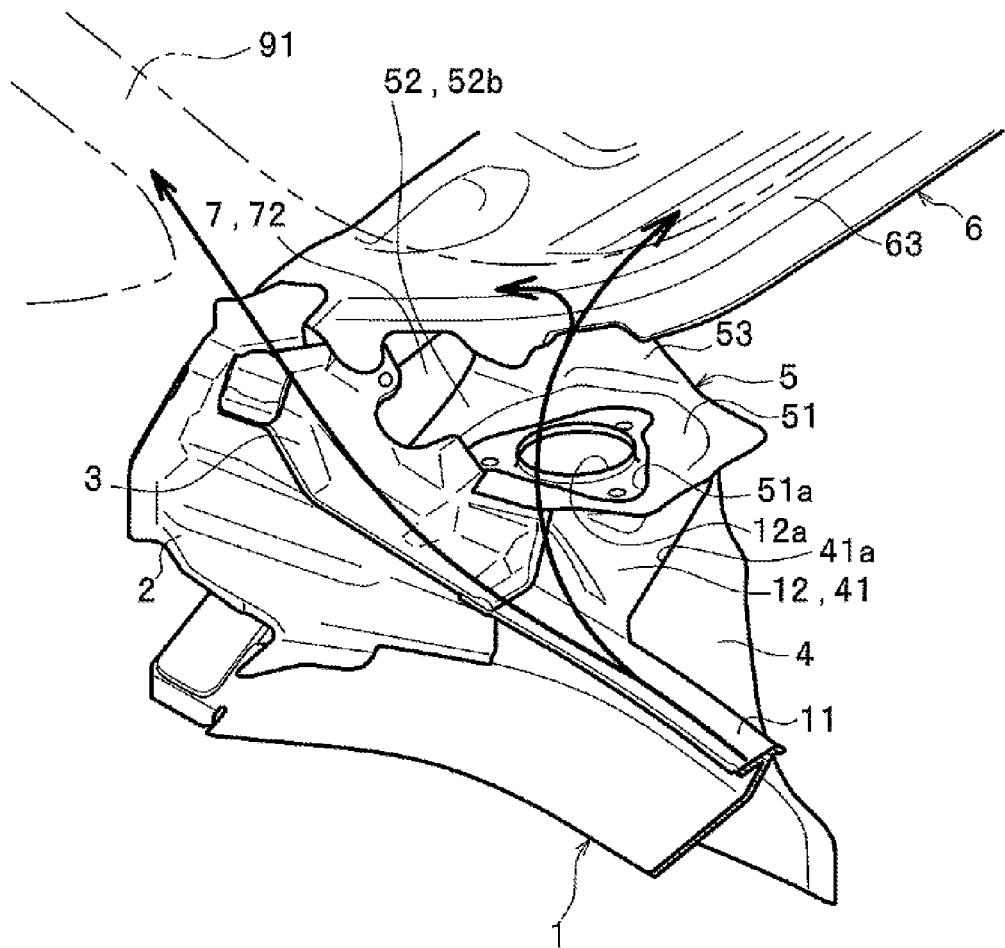
FIG. 10 is a partially enlarged perspective view illustrating load transmission in the vehicle front structure schematically.

Shortly, as illustrated by an arrow in FIG. 10, the collision load applied on the upper member 1 is dispersed as a load applied on a side section of a body such as the side member 3, the side extension 2 and the front pillar 91, and as a load applied on a center section of the body such as the cross member 7 and the windshield lower 6.

Especially, in the embodiment, since the damper housing 4 as a rigid body is coupled with the cross member 7 by the side wall section 52 and the vertical wall section 53 to form the highly rigid body at the front of the vehicle, the collision load applied on the upper member 1 can be smoothly transmitted to the damper housing 4, the damper housing support 5, the cross member 7 and the windshield lower 6. This makes it possible to absorb the collision energy favorably and the load burden applied on the side extension 2 and the side member 3 can be reduced.

The side wall section 52 of the damper housing support 5 extends downward and backward from the rear end part of the damper housing fixed section 51 along the rear end part of the damper housing 4 to be fixed on the cross member 7. Further, the vertical wall section 53 of the damper housing support 5 extends upward and backward from the inside of the damper housing fixed section 51 in the vehicle width direction to be fixed on the cross member 7. Therefore, when the damper housing 4 moves backward at the time of front collision, the collision load along the front-back direction is transmitted to the side wall section 52 and the vertical wall section 53. Accordingly, the collision energy can be absorbed after the side wall section 52 and the vertical wall section 53 are crushed, and the collision load can be transmitted over the cross member 7 via the side wall section 52 and the vertical wall section 53.

According to the embodiment, the damper housing 4 is fixed on the upper member 1 and is fixed to the cross member 7 forming the closed section K with the windshield lower 6 via the side wall section 52 and the vertical wall section 53 of the damper housing support 5. In this way, the damper housing 4 is supported by the two members, that is, the upper member 1 and the cross member 7, and the rigidity of the damper housing support 5 in the front-back direction and the up-down direction is improved by the side wall section 52 and the vertical wall section 53. Therefore, support rigidity of the damper housing 4 enhances. Thus, the damper housing 4 is difficult to deform due to a load in the up-down direction applied on a damper, and the rigidity of the front of the body enhances, leading to the following effects:

(1) Strain deformation in the front of the body can be restrained and ride quality increases.

(2) Deflection over the front of the body can be restrained and operation stability increases.

(3) Oscillation frequency inherent in the body generated due to oscillation from an engine is changed by increasing the rigidity of the front of the body, and body oscillation can be restrained by avoiding resonance of the oscillation frequency in the front of the body and the oscillation frequency of the engine.

(4) Any reinforcement members are not needed separately to increase the rigidity of the front of the body and weight reduction of the body can be achieved.

Figure 11:
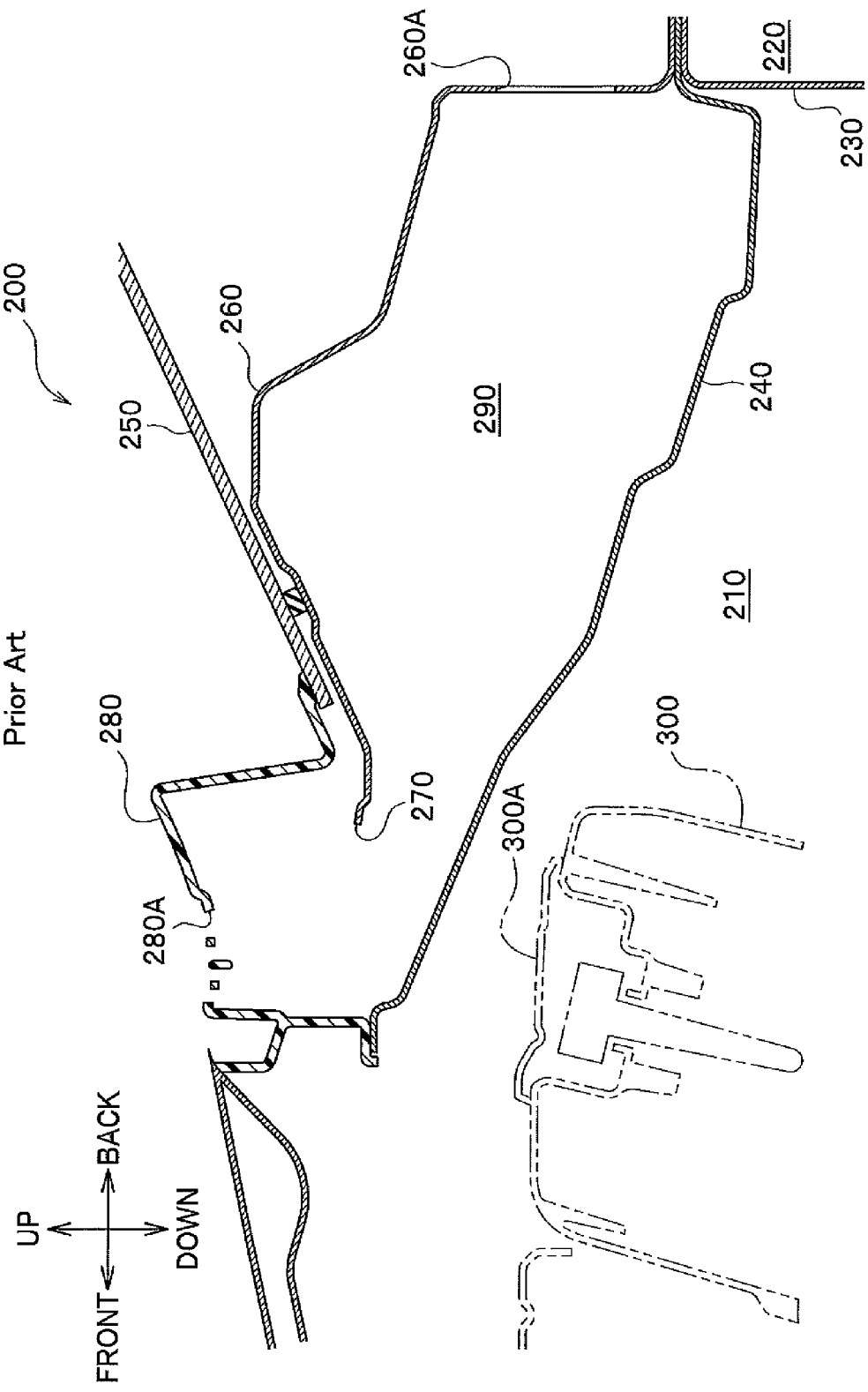
FIG. 11 is a side end view illustrating a vehicle front structure in a prior art.

Referring to FIGS. 6 and 11, the vehicle front structure 100 of the invention will be compared with a vehicle front structure 200 of the prior art.

As illustrated in FIG. 11, the vehicle front structure 200 of the prior art has a dashboard upper 240 which extends forward from an upper end part of a dashboard lower 230 partitioning an engine room 210 from a compartment 220, a windshield lower 260 which supports an lower end part of the windshield 250, and a cowl top 280 which covers an outside air inlet port 270 formed between the dashboard upper 240 and the windshield lower 260. An outside air inlet bore 280A is formed in the cowl top 280, and a blower inlet port 260A which is coupled to a blower (not illustrated) is formed in the windshield lower 260.

In the conventional vehicle front structure 200, since gas is separated from liquid in a space 290 formed by the dashboard upper 240 and the windshield lower 260, fluid speed of water needs to be decreased by enlarging the space 290 to have a large section with the aid of the dashboard upper 240 having large section size. Therefore, clearance between the dashboard upper 240 and the engine head 300A becomes shorter accordingly and the cowl top 280 cannot be lowered largely.

On the other hand, as illustrated in FIG. 6, in the embodiment, the concave-shaped drain H seen in cross section is formed along the right-left direction by the slope section 52a, the bottom wall section 52b of the side wall section 52 and the vertical wall section 72 of the cross member 7. Further, the vertical wall section 53 (see FIG. 5) is provided inside the drain H in the vehicle width direction. Therefore, the water flowing from the outside of the vehicle V is directly introduced to the side wall section 52 of the damper housing support 5 or is introduced to the side wall section 52 via the vertical wall section 72 of the cross member 7. Then, the water is drained to the side section of the vehicle V via the bottom wall section 52b of the side wall section 52 and the gas can be separated from the liquid properly.

Further, in the embodiment, the blower inlet port 62a is provided to the position where the outside air inlet port 72a does not overlap the blower inlet port 62a seen in the front-back direction of the vehicle. Therefore, even if passing through the outside air inlet port 72a, the water hits on the vertical wall section 62 of the windshield lower 6 and the water cannot flow in the blower inlet port 62a, resulting in an excellent property on gas-liquid separation.

In other words, according to the embodiment, the gas can be separated from the liquid favorably by the side wall section 52, the vertical wall section 53 of the damper housing support 5, the vertical wall section 72 of the cross member 7 and the vertical wall section 62 of the windshield lower 6. Therefore, the dashboard upper 240 having the large section size which has been used can be omitted, and the windshield lower 6, the cowl top 8 and the like can be lowered accordingly. Thus, front visibility of the vehicle V can be promoted.

Further, as illustrated in FIG. 11, since the conventional vehicle front structure 200 has the dashboard upper 240 having the large section size, the clearance between the dashboard upper 240 and the engine 300 in the front-back direction of the vehicle is shortened. Therefore, the dashboard upper 240 and the windshield lower 260 cannot be arranged forward. Thus, the windshield 250 cannot be projected forward and compartment space cannot be expanded.

On the other hand, in the embodiment, since the dashboard upper 240 having the large section size which has been used previously can be omitted, the windshield lower 6, the cowl top 8 and the like can be arranged forward accordingly. Therefore, since the windshield 93 can be projected forward, the compartment space can be expanded.

According to the embodiment, the windshield 93 is supported at the front end side of the windshield lower 6 in the cantilever structure and the closed section K is formed by the windshield lower 6 and the cross member 7 at the base end side (rear end side) of the windshield lower 6. Therefore, the support rigidity at the base end side is improved and the front end side of the windshield lower 6 is easily bent to the load from above, thereby the load from above can be absorbed in a good manner.

Especially, in the embodiment, since the dashboard upper 240 having the large section size can be omitted, no member impedes deformation of the windshield lower 6 below around the center section of the windshield lower 6 in the vehicle width direction. Therefore, collision absorption stroke of the windshield lower 6 to the load from above can be reserved, thereby the load from above can be absorbed much better.

Further, in the embodiment, the gap C is formed between the front end side of the windshield lower 6 and the upper end part of the vertical wall section 53 of the damper housing support 5. Therefore, the collision absorption stroke of the windshield lower 6 to the load from above can be reserved even at both the end sides of the windshield lower 6 in the vehicle width direction, thereby the load from above can be absorbed much better.

According to the embodiment, since the dashboard upper 240 can be omitted, the weight of the body can be reduced.

The embodiment of the invention is described in detail with reference to the drawings, but the invention is not limited thereto and can be appropriately changed without departing from the subject matter of the invention.

Though the windshield lower 6 and the like constituting the vehicle front structure 100 of the embodiment are made of the steel members, the invention is not limited thereto and they may be formed by press-forming a metallic plate such as an aluminum plate.

Though the blower inlet port 62a of the embodiment is provided at the position corresponding to the right outside air inlet port 72a, the invention is not limited thereto, and it may be provided at a position corresponding to the left outside air inlet port 72b or between the right and the left side outside air inlet ports 72a and 72b (for example, the center of the windshield lower 6 in the vehicle width direction).

Though the blower inlet port 62a and the outside air inlet ports 72a, 72b of the invention are formed in a rectangular shape, the invention is not limited thereto and they may be formed in other shapes such as in a circular shape.

Referring to FIGS. 12 to 22, a vehicle front structure 110 according to a second embodiment of the invention will be explained. In the descriptions, differences from the first embodiment will be particularly explained, a same element as that of the first embodiment will be labeled with a same numeral and redundant explanations will be omitted. In the vehicle front structure 110 according to the second embodiment, the structures of the damper housing support 5, the windshield lower 6, the cross member 7 and the cowl top 8 are different from those of the first embodiment. Further, the second embodiment is different from the first embodiment in that a reinforcement member 9, a wiper device 10 and a covering member S are further provided.

<Damper Housing Support>

Figure 13:
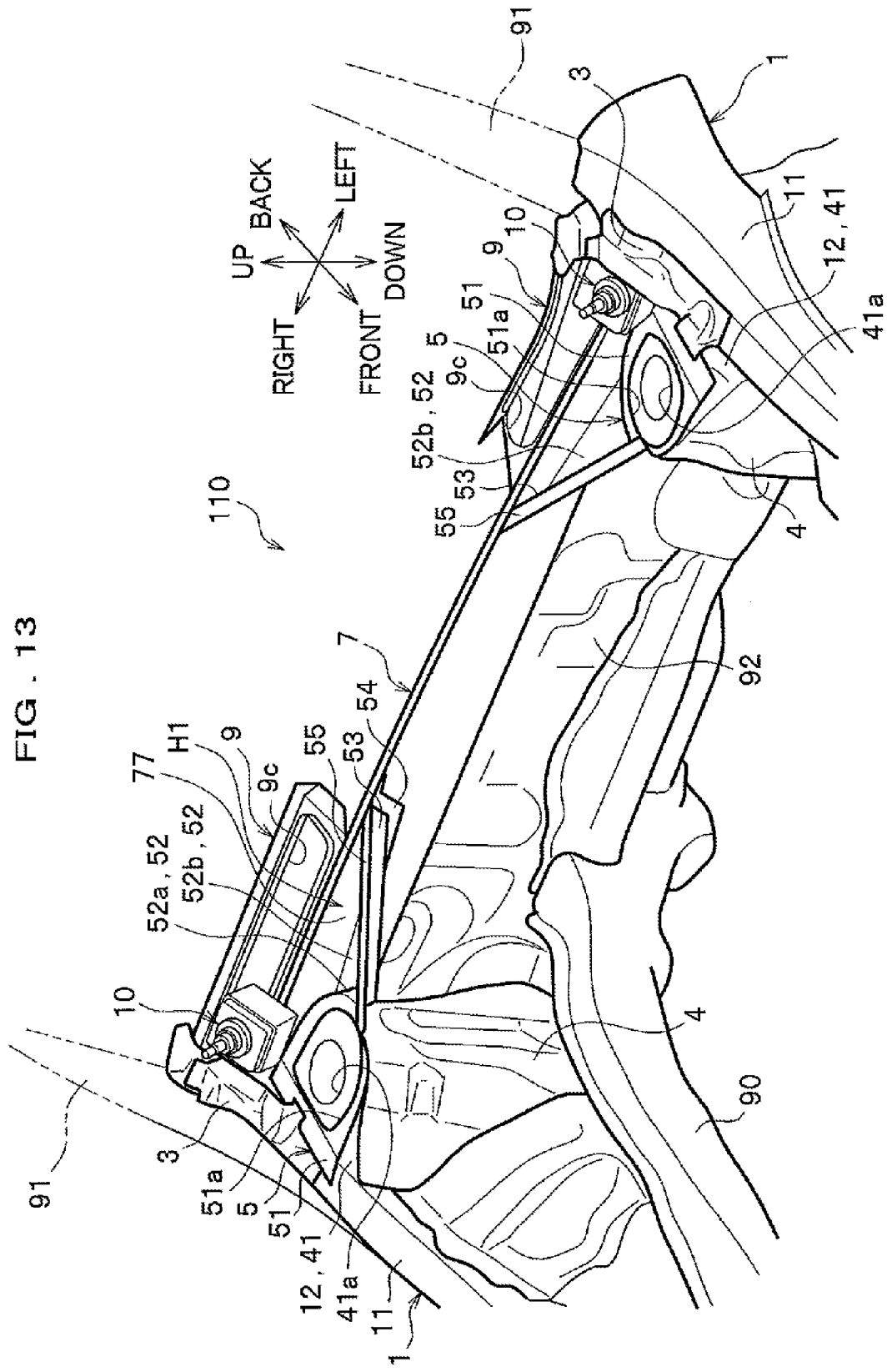
FIG. 13 is a schematic perspective view seen down from a diagonally front left side of the vehicle front structure without a cowl top and a windshield lower.

FIG. 13 is a schematic perspective view seen down from a diagonally front left side of the vehicle front structure without the cowl top and the windshield lower.

As illustrated in FIG. 13, the damper housing support 5 has the damper housing fixed section 51, the side wall section 52 and the vertical wall section 53.

The damper housing fixed section 51 is a portion which is fixed on the upper surface 41 of the damper housing 4. In the embodiment, the upper surface 41 of the damper housing 4 and the upper surface of the damper housing fixed section 51 constitute a flow orientation surface on which the outside air from the outside air introduction port 81 and an outside air inlet bore 85 of the cowl top 8 described later flows.

Figure 12:
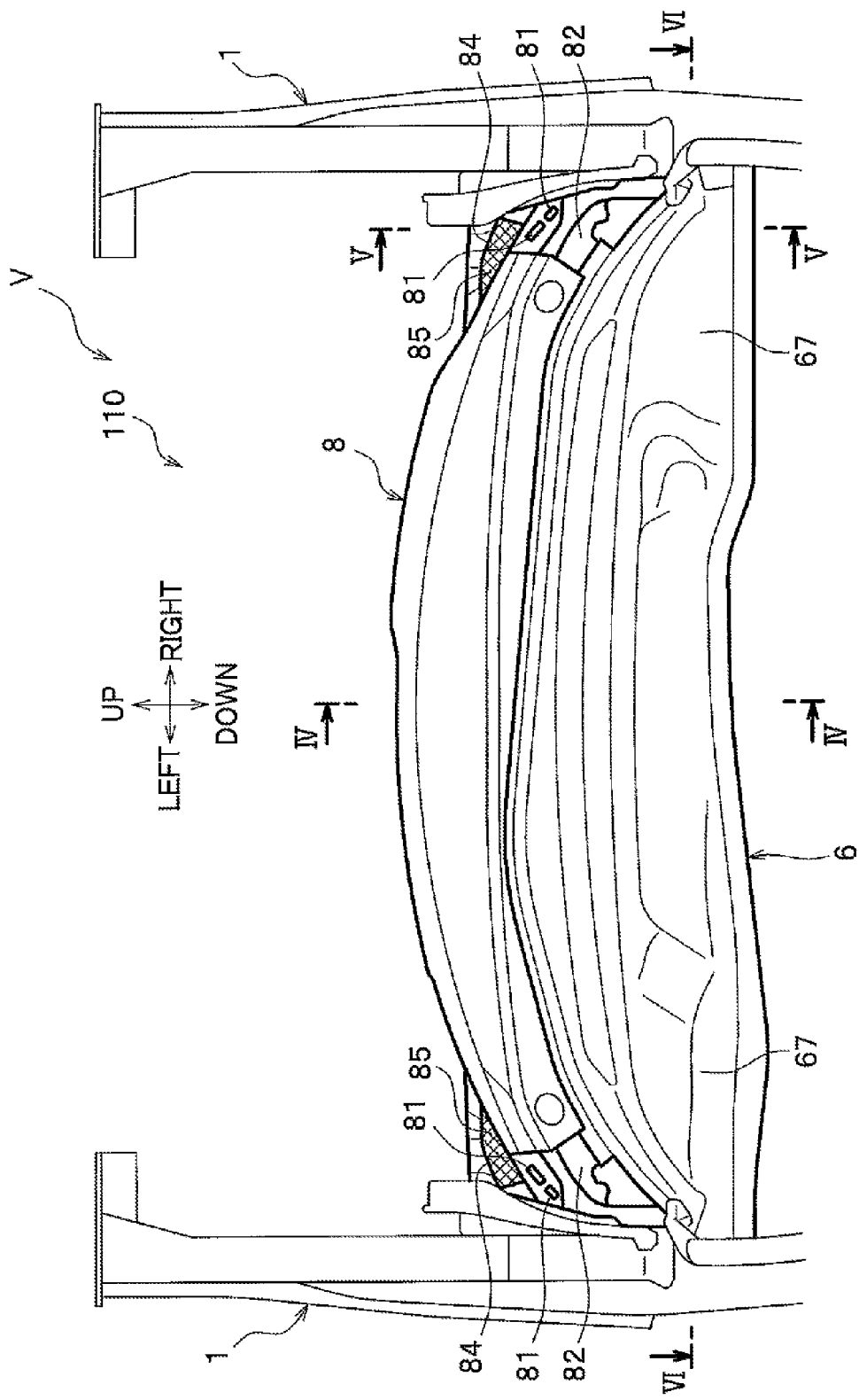
FIG. 12 is a partial plan view of the vehicle front structure according to a second embodiment of the invention.
Figure 16:
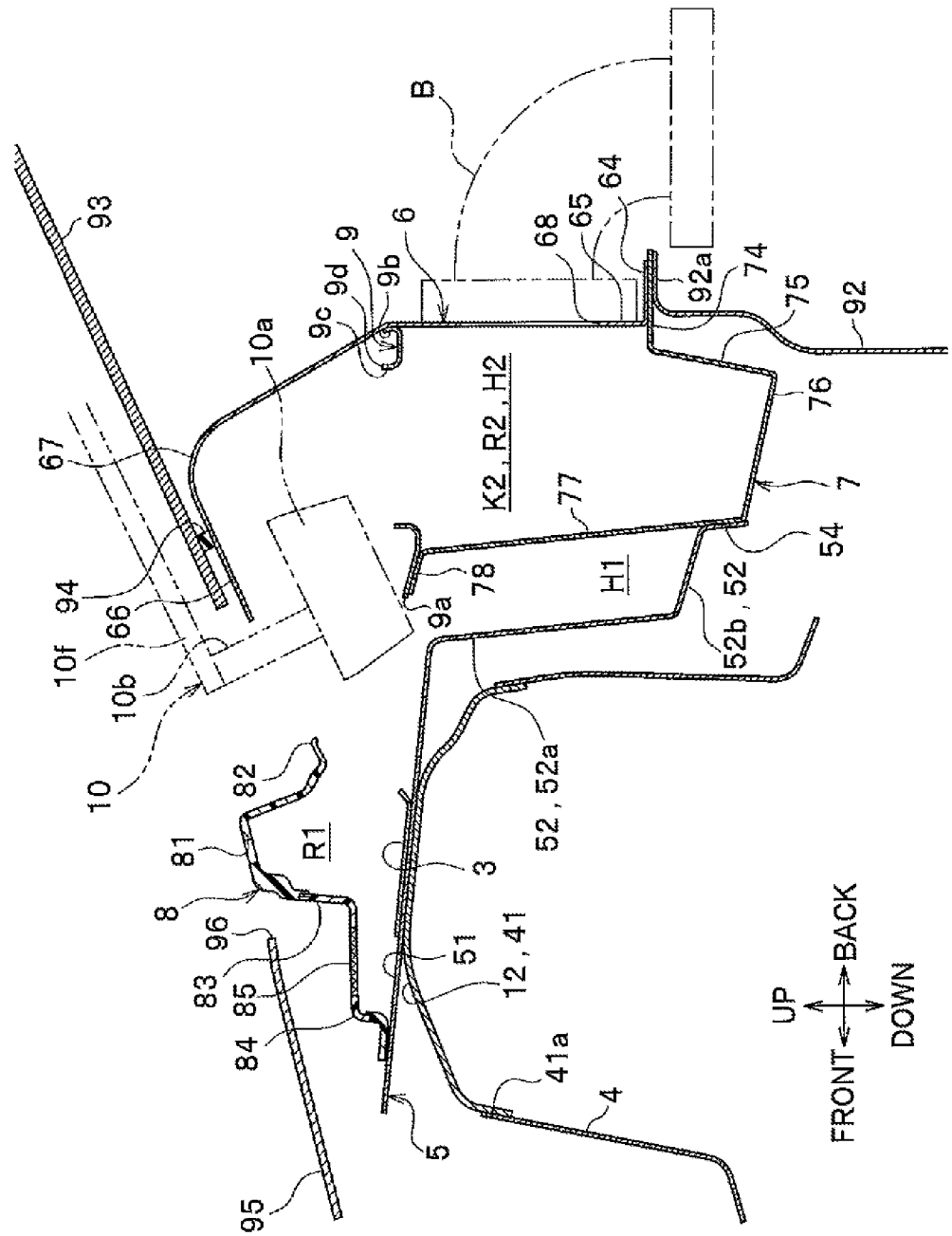
FIG. 16 is an end view along V-V line in FIG. 12.

FIG. 12 is a partial plan view of the vehicle front structure according to the second embodiment of the invention, and FIG. 16 is an end view along V-V line in FIG. 12.

As illustrated in FIG. 16, the side wall section 52 is a section which extends downward and backward from the rear end part of the damper housing fixed section 51. The side wall section 52 positions behind the rear end part at an upper side of the damper housing 4 and extends along the rear end part. The side wall section 52 has the slope section (front wall section) 52a extending incliningly so as to position downward as extending backward from the rear end part of the damper housing fixed port 51, and the bottom wall section 52b extending backward from the lower end part of the slope section 52a and fixed on the cross member 7. The bottom wall section 52b inclines to position downward as extending outside in the vehicle width direction.

As illustrated in FIG. 13, the vertical wall section 53 is a linear section which extends backward from the inside of the damper housing fixed portion 51 in the vehicle width direction. The vertical wall section 53 inclines to position inside in the vehicle width direction (the central side of the cross member 7 in the vehicle width direction) as extending backward from a front. The vertical wall section 53 is formed continuously inside the side wall section 52 in the vehicle width direction. In the embodiment, a concave-shaped first drain H1 seen in vertical cross section is formed in the right-left direction by the slope section 52a, the bottom wall section 52b, the vertical wall section 53 and a front side vertical wall section 77 of the cross member 7. Further, an approximately L-shaped cross section is formed by the bottom wall section 52b and the vertical wall section 53.

A flange section 54 fixed on the cross member 7 is formed on the rear end part of the bottom wall section 52b and the vertical wall section 53. The flange section 54 extends in the direction (the up-down direction or the right-left direction) perpendicular to the bottom wall section 52b and the vertical wall section 53. Further, a flange section 55 is formed extendingly inside in the vehicle width direction on the upper end part of the vertical wall section 53.

<Windshield Lower>

FIG. 14 is an end view along IV-IV line in FIG. 12.

As illustrated in FIG. 14, the windshield lower 6 is a member which supports the windshield 93 from underneath. The windshield lower 6 has a flange section (second flange section) 64 which extends in the front-back direction to be fixed on a flange section 92a of the dashboard lower 92, a vertical wall section (rear wall section) 65 which extends upward from a front end part of the flange section 64, and a side wall section (windshield support section) 66 which extends from an upper end part of the vertical wall section 65 toward the windshield 93 (forward). The side wall section 66 is fixed on a lower surface of the windshield 93 with the adhesive 94.

FIG. 15A is a perspective view where the windshield lower is seen down from a diagonally rear side, and FIG. 15B is an end view along VII-VII line in FIG. 15A.

As illustrated in FIG. 15B, both right and left end parts of the windshield lower 6 are fixed on the right and left upper member 1, respectively. The right and left end parts of the windshield lower 6 may be fixed on the front pillar 91, respectively. As illustrated in FIG. 15A, a pair of bulged sections 67 which bulge (project) upward with respect to a rear part on a central side are provided at both the right and left end sides of the windshield lower 6, respectively. A blower inlet port 68 in an approximately rectangular shape opens at a rear part on a lower end side of the right bulged section 67. As illustrated in FIG. 16, a blower B which supplies the outside air to the compartment CR is coupled with a rear of the blower inlet port 68.

<Cross Member>

As illustrated in FIG. 14, the cross member 7 is fixed on a base end part side (rear end part side) of the windshield lower 6 and forms a central closed section K1 with the windshield lower 6, the central closed section K1 extending in the vehicle width direction. The cross member 7 has a lower flange section (third flange section) 74, a rear side vertical wall section 75 extending downward from a front end part of the lower flange section 74, a side wall section 76 extending forward from a lower end part of the rear side vertical wall section 75, a front side vertical wall section 77 extending upward from a front end part of the side wall section 76, and an upper flange section 78 extending diagonally upward from an upper end part of the front side vertical wall section 77.

The lower flange section 74 is sandwiched in the up-down direction between the flange section 92a of the dashboard lower 92 partitioning the engine room ER from the compartment CR and the flange section 64 of the windshield lower 6, and is fixed by a fixing manner such as welding. The upper flange section 78 is fixed on the side wall section 66 of the windshield lower 6 by the fixing manner such as welding. As illustrated in FIG. 16, both right and left end parts of the front side vertical wall section 77 face the side wall section 52 of the damper housing support 5.

Figure 17:
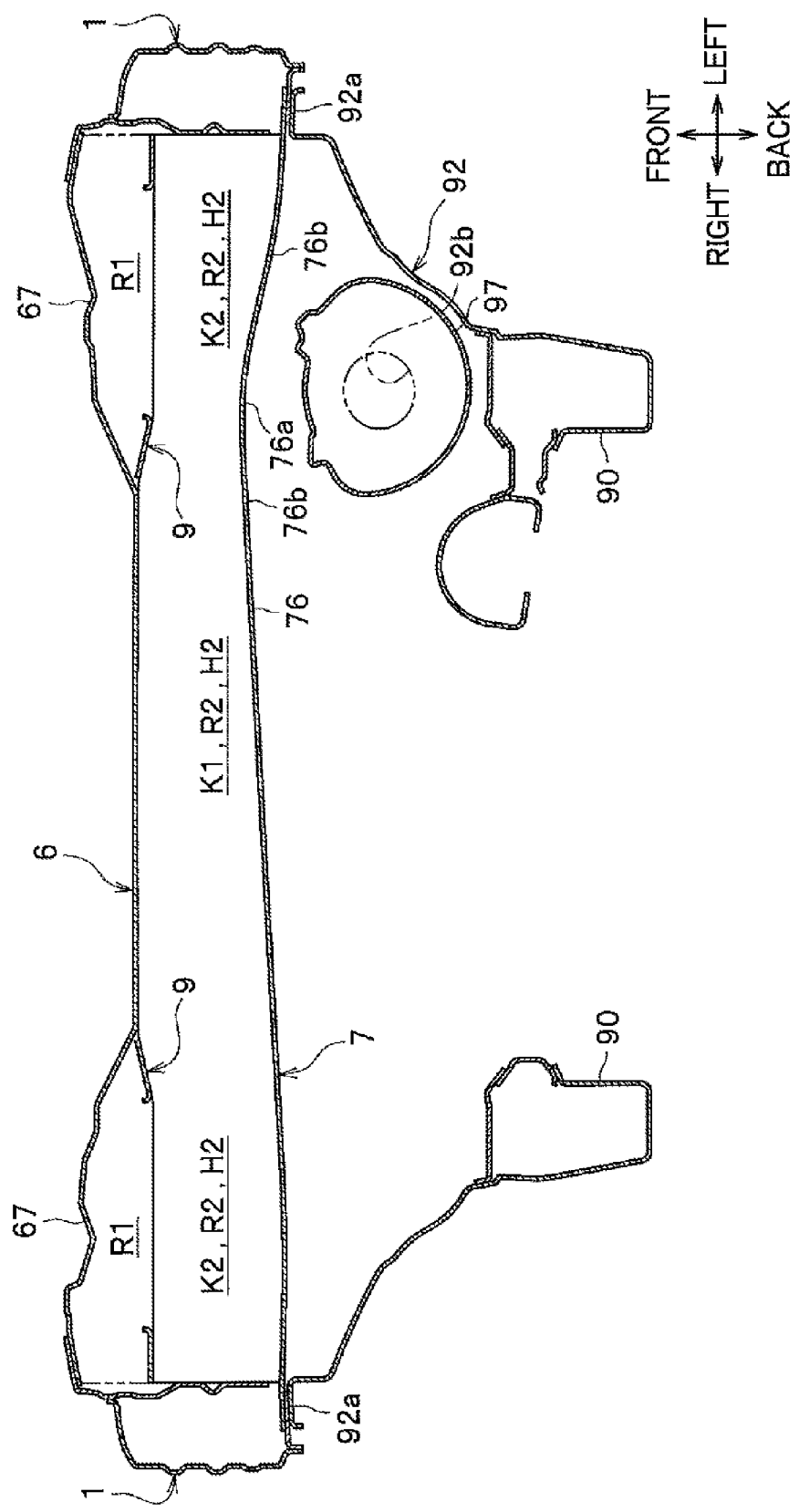
FIG. 17 is an end view along VI-VI line in FIG. 12.

FIG. 17 is an end view along VI-VI line in FIG. 12.

As illustrated in FIG. 17, the side wall section (bottom wall section) 76 is formed in a tight lipped mouth shape with both ends turned down seen in vertical cross section and positions above a brake master cylinder 97 attached in the dashboard lower 92. A circular-shaped attachment bore 92b (see a two-dot chain line in FIG. 17) for attaching the brake master cylinder 97 is formed at a left lower part of the dashboard lower 92. The side wall section 76 has a runoff 76a projecting upward at a corresponding position to the brake master cylinder 97 in the up-down direction. A pair of inclined planes 76b which incline downward toward the outside in the vehicle width direction are formed consecutively at both right and left sides of the runoff 76a. Both right and left end parts of the cross member 7 are fixed on the upper member 1 and the front pillar 91, respectively (only a fixed state with the upper members 1 is illustrated in FIG. 17).

<Reinforcement Member>

As illustrated in FIG. 13, the reinforcement member 9 is a steel member which is provided at both the end sides of the cross member 7 in the vehicle width direction respectively and extends to the upper member 1 and the front pillar 91. As illustrated in FIG. 16, the reinforcement member 9 is arranged between the bulged section 67 of the windshield lower 6 and the cross member 7, and has a function to reinforce both the end sides of the windshield lower 6 in the vehicle width direction. A front flange section 9a is formed which is fixed on the upper flange section 78 of the cross member 7 at a front end part of the reinforcement member 9. A rear flange section 9b is formed which is fixed on an inner surface of the bulged section 67 at a rear end part of the reinforcement member 9. An outside air inlet port 9C in an approximately rectangular shape opens for passing the outside air at a central part of the reinforcement member 9. A projection section 9d is formed to project upward at an opening edge part of the outside air inlet port 9c. In the embodiment, the reinforcement members 9, the cross member 7 and the bulged sections 67 of the windshield lower 6 form an end closed section K2 extending in the vehicle width direction at both the right and left sides, respectively. The central closed section K1 and the end closed section K2 communicate to each other (see FIG. 17).

<Cowl Top>

Figure 18:
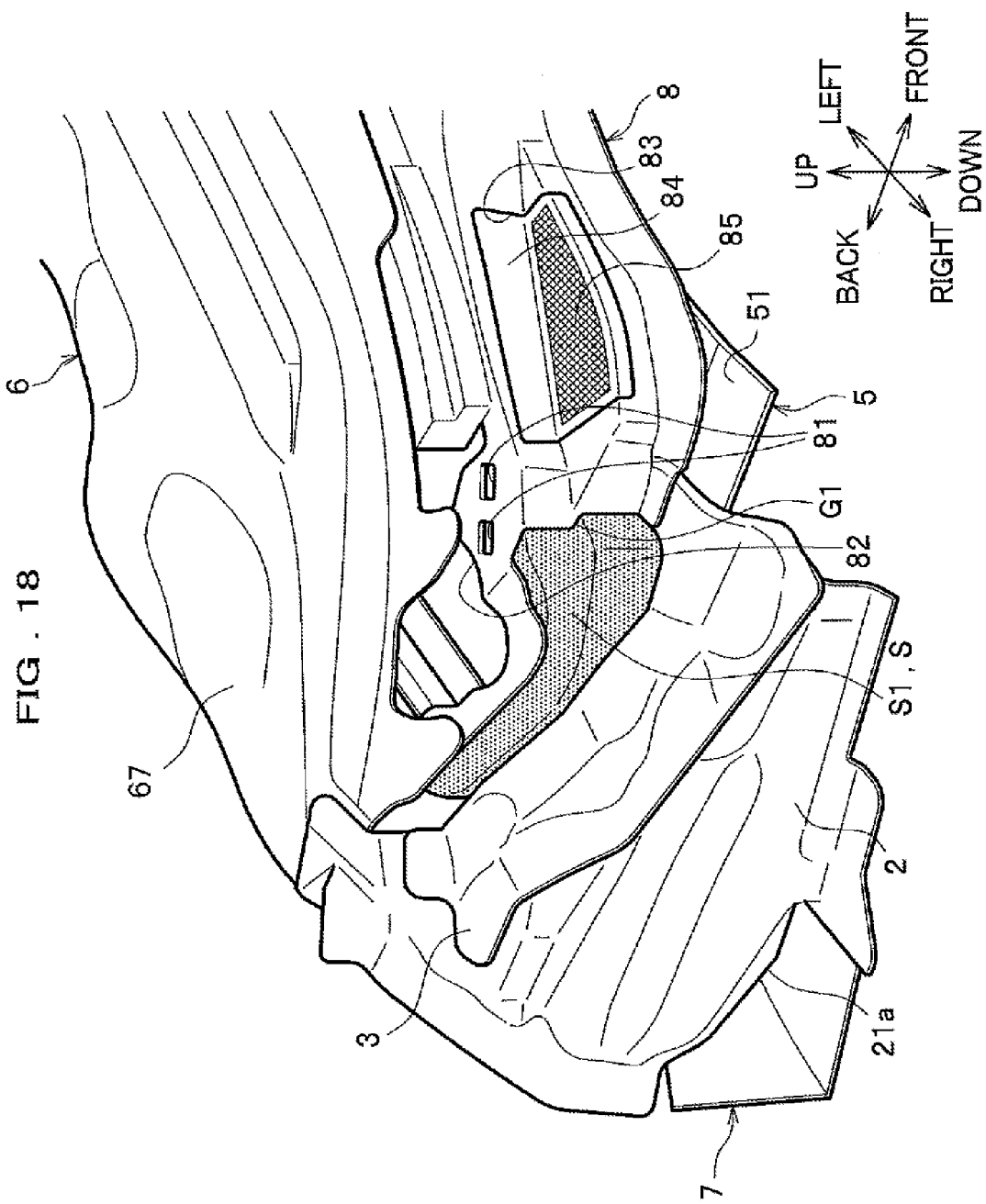
FIG. 18 is a partially enlarged perspective view seen down from a diagonally front right side of a right portion in the vehicle front structure with an outer lid member.

As illustrated in FIG. 14, the cowl top 8 is a hat-shaped resin member covering the opening 96 formed between the engine hood 95 and the windshield lower 6. A rear end part on the central side of the cowl top 8 in the vehicle width direction is placed on an upper surface of the windshield 93. As illustrated in FIG. 16, both the right and left end sides of the cowl top 8 are arranged above the damper housing support 5. As illustrated in FIG. 18, the outside air introduction port 81 in an approximately rectangular shape for introducing the outside air from the outside of the vehicle V and a wiper opening 82 for exposing a wiper shaft 10b of a wiper device 10 to the outside are formed respectively on an upper surface of the cowl top 8 at both the right and left end sides. An opening for operation 83 facing the upper surface 41 of the damper housing 4 and an upper surface of the damper housing support 5 is formed on a front surface of the cowl top 8 at both the right and left end sides, respectively. The opening for operation (first opening) 83 positions in front of a first inlet passage R1 and is closed by a resin damper attachment lid 84. The damper attachment lid 84 is detachably provided on the opening for operation 83. In case of a removing/attaching operation for the damper or a maintenance operation, removing the damper attachment lid 84 allows a user to perform the removing/attaching operation for the damper and the maintenance operation easily. The outside air introduction bore 85 in a form of lattice is formed on an upper surface of the damper attachment lid 84, facing the upper surface 41 of the damper housing 4 and the upper surface of the damper housing support 5. The outside air introduction bore (second opening) 85 has a function to introduce the outside air to the first inlet passage R1.

<Covering Member>

Figure 19:
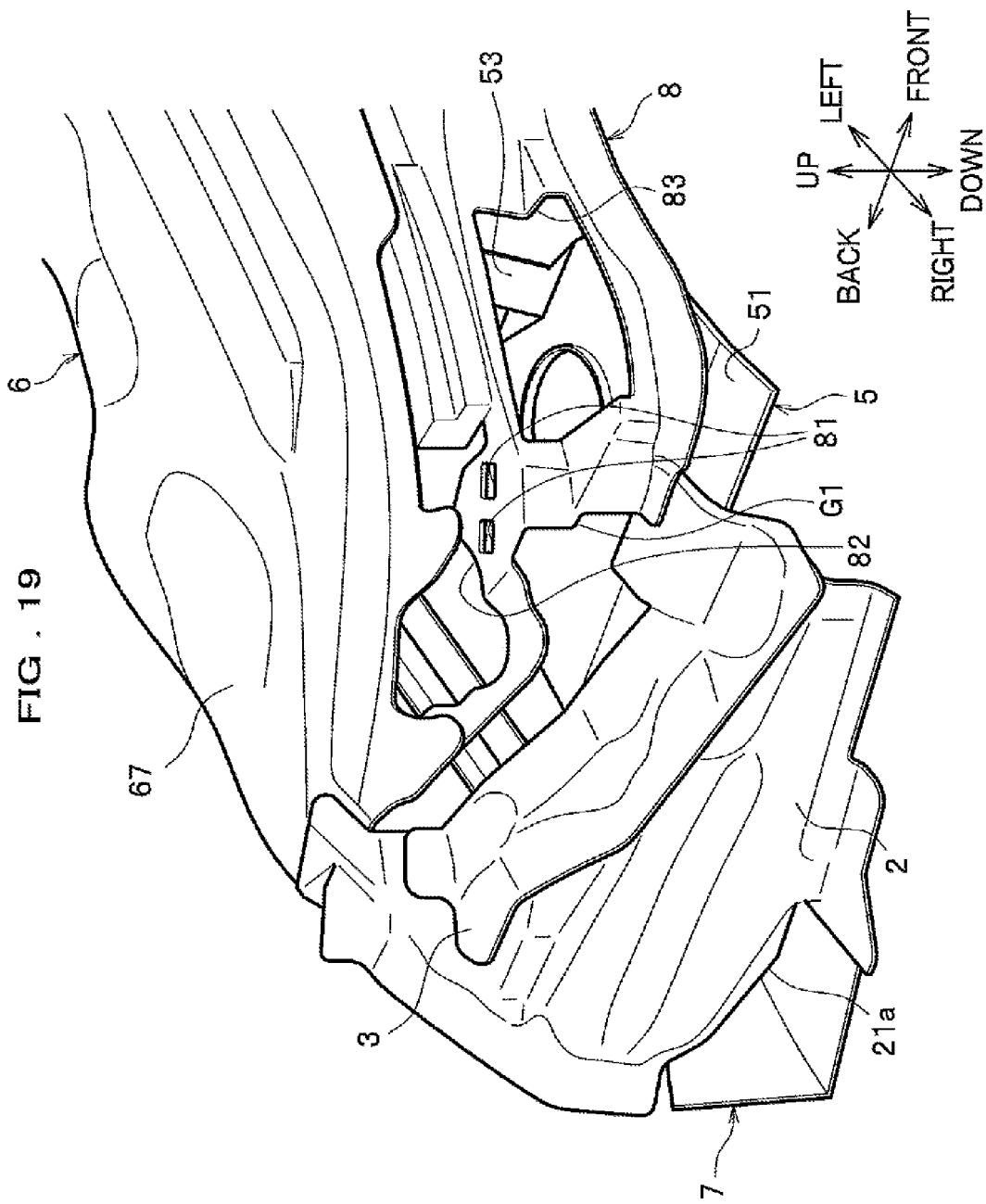
FIG. 19 is a partially enlarged perspective view seen down from the diagonally front right side of the right portion in the vehicle front structure without the outer lid member.
Figure 20:
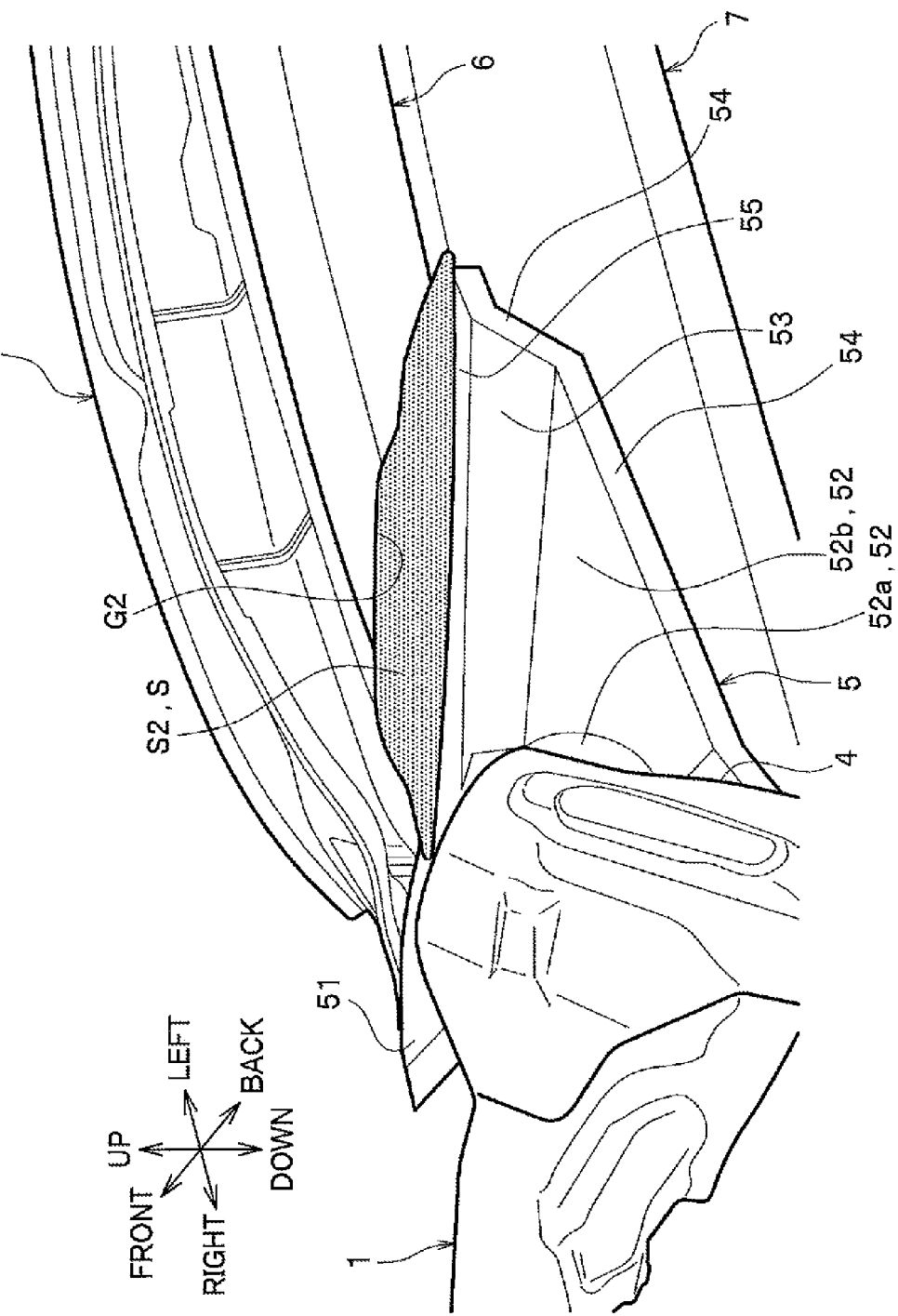
FIG. 20 is a partially enlarged perspective view seen up from a diagonally front left side of the right portion in the vehicle front structure with an inner lid member.
Figure 21:
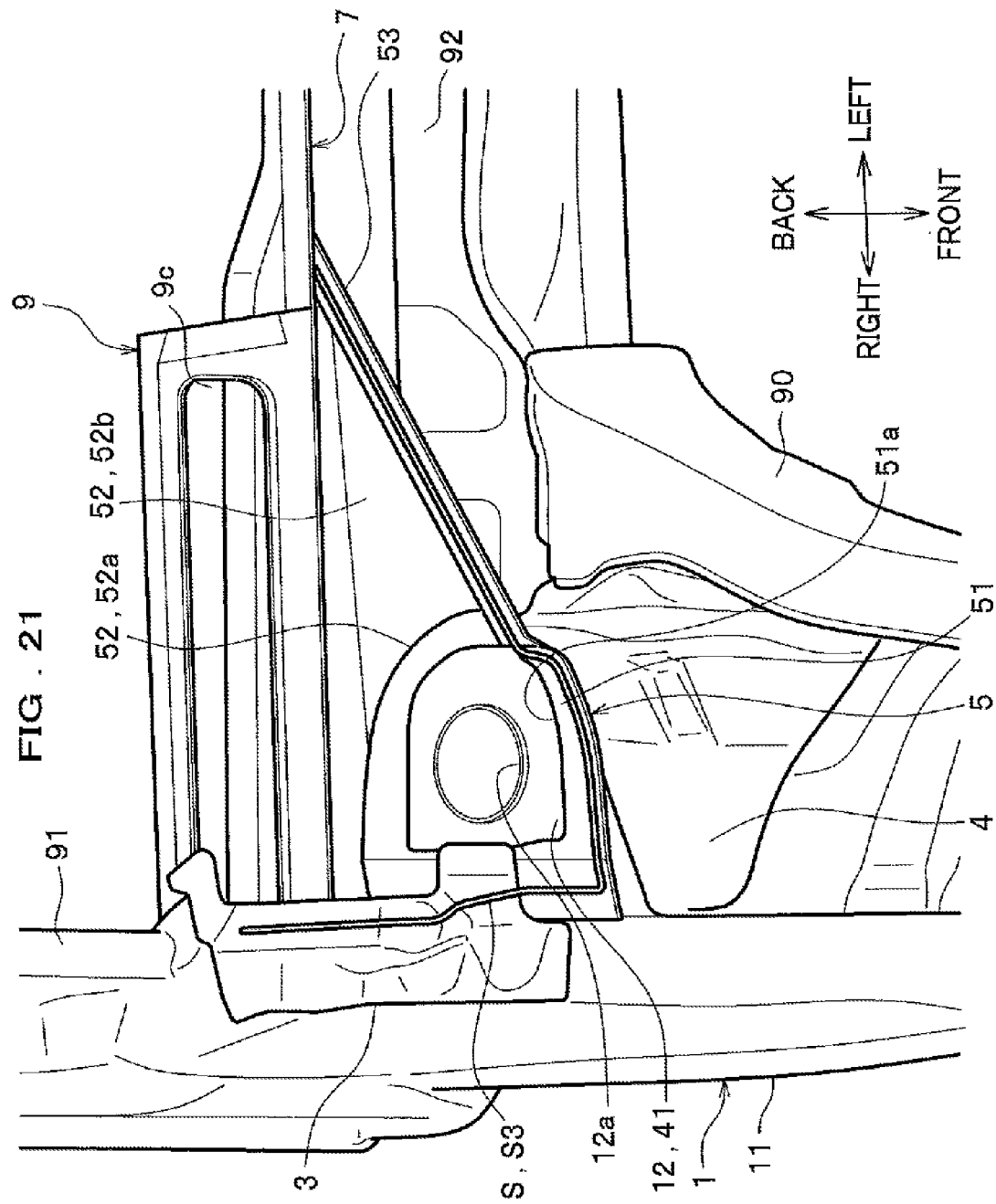
FIG. 21 is a schematic perspective view seen down from a diagonally front side of the right portion in the vehicle front structure without the cowl top and the windshield lower.

FIG. 18 is a partially enlarged perspective view seen down from a diagonally front right side of the right portion in the vehicle front structure with an outer lid member. FIG. 19 is a partially enlarged perspective view seen down from the diagonally front right side of the right portion in the vehicle front structure without the outer lid member. FIG. 20 is a partially enlarged perspective view seen up from a diagonally front left side of the right portion in the vehicle front structure with an inner lid member. FIG. 21 is a schematic perspective view seen down from a diagonally front side of the right portion in the vehicle front structure without the cowl top and the windshield lower.

As illustrated in FIGS. 18 to 21, the covering member S has an outer lid member S1, an inner lid member S2 and a sealing material S3. As illustrated in FIGS. 18 and 19, the outer lid member S1 is made of, for example, a plate-like rubber and has a function to close a gap G1 formed between the cowl top 8 and the side member 3. As illustrated in FIG. 20, the inner lid member S2 is made of, for example, a plate-like rubber and has a function to close a gap G2 between the vertical wall section 53 of the damper housing support 5 and the cowl top 8 and between the vertical wall section 53 of the damper housing support 5 and the windshield lower 6. As illustrated in FIG. 21, the sealing material S3 is disposed on upper surfaces of the side member 3 and the damper housing support 5. As illustrated in FIGS. 18 to 21, the sealing material S3 has a function to seal liquid-tightly and air-tightly between the outer lid member S1 and the side member 3, between the cowl top 8 and the damper housing fixed section 51, and between the inner lid member S2 and the vertical wall section 53. The covering member S can restrain that hot air from the engine room ER flows to the first inlet passage R1 and that the water flows from the outside of the vehicle to the first inlet passage R1.

<First Inlet Passage, Second Inlet Passage>

As illustrated in FIG. 16, the first inlet passage (outside air introduction passage) R1 is formed above the damper housing support 5 and is provided at both the right and left sides of the vehicle V, respectively. The first inlet passage R1 extends in the front-back direction and corresponds to a space from the outside air introduction port 81 and the outside air introduction bore 85 to the outside air inlet port 9c. The cowl top 8, the damper housing support 5, the windshield lower 6, the reinforcement member 9, the covering member (see FIGS. 18 to 21), and the upper member 1 (see FIG. 17) form the first inlet passage R1. Further, as illustrated in FIG. 17, a second inlet passage R2 extends in the right-left direction, which lets the first inlet passage R1 at both the right and left sides communicate via the central closed section K1 and the end closed section K2. Such a structure enables the outside air introduced from the outside air introduction port 81 and the outside air introduction bore 85 at a front right side of the cowl top 8 to flow through the first inlet passage R1 and the outside air inlet port 9c at a right side and to be delivered from the blower inlet port 68 toward the blower B (see FIGS. 12 and 16). While, the outside air introduced from the outside air introduction port 81 and the outside air introduction bore 85 at a front left side of the cowl top 8 flows through the first inlet passage R1 and the outside air inlet port 9c at a left side, then, further flows from the left side to the right side in the second inlet passage R2. Consequently, the outside air is delivered from the blower inlet port 68 toward the blower B (see FIGS. 12, 16 and 17). The central closed section K1 and the end closed section K2 also function as a second drain H2 by which the water passing the outside air inlet port 9c is drained to the side section of the vehicle V. Though the embodiment is explained with a left-handle drive car, in case of a right-handle drive car, the blower inlet port 68, the blower B, the brake master cylinder 97, the attachment bore 92b, the runoff 76a and the like are positioned with the right and left sides reversed.

<Wiper Device>

Figure 22:
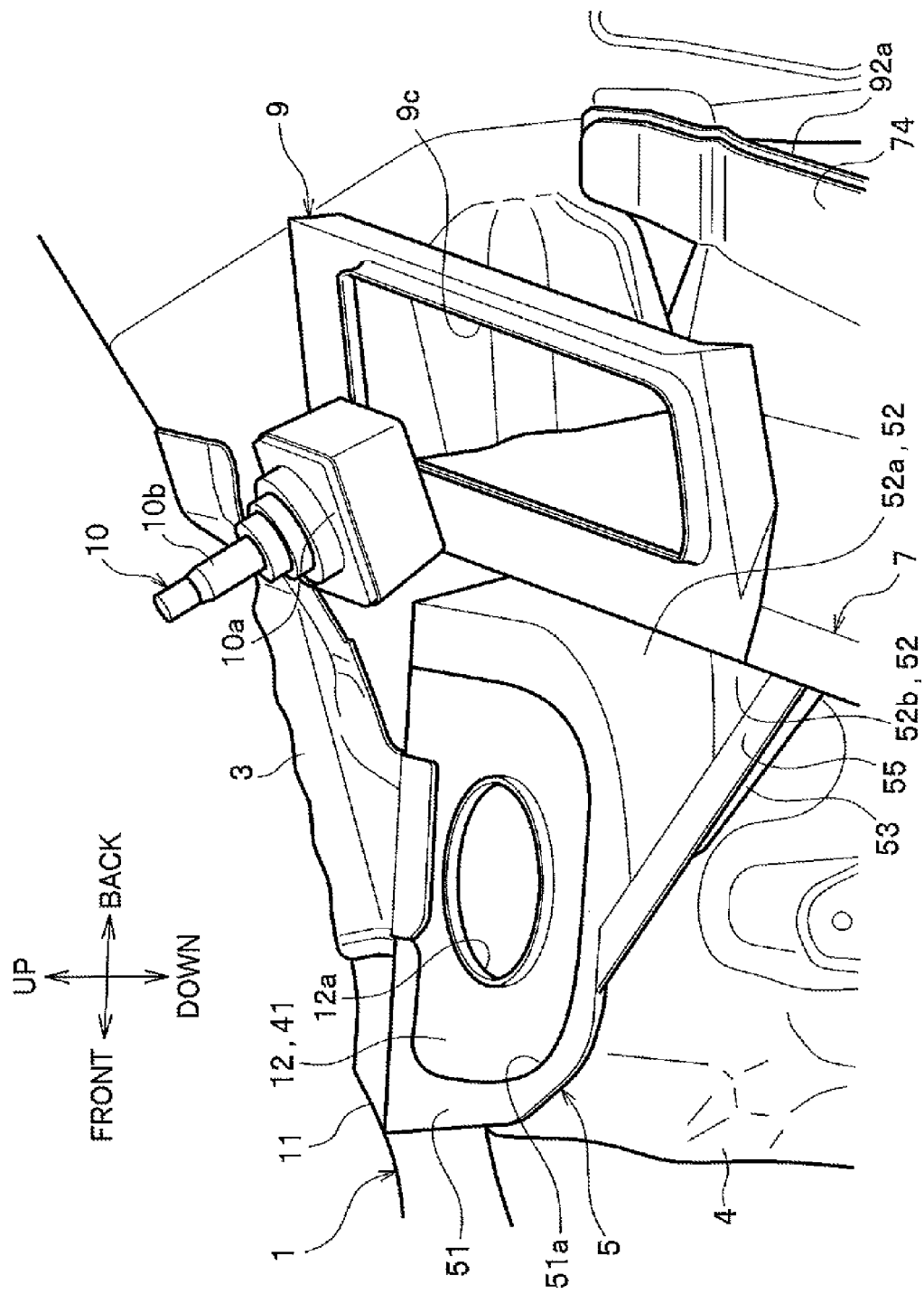
FIG. 22 is a partially enlarged perspective view seen down from a left side around a right wiper device.

FIG. 22 is a partially enlarged perspective view seen down from a left side around a right wiper device.

As illustrated in FIG. 16, the wiper device 10 is a device which is arranged in the first inlet passage R1 and wipes off water, snow etc. on the windshield 93. The damper housing support 5 and the cross member 7 are arranged under the wiper device 10. As illustrated in FIG. 22, the wiper device 10 has a wiper base 10a and a wiper shaft 10b which is attached on an upper part of the wiper base 10a and extends upward. As illustrated in FIG. 16, the wiper shaft 10b exposes from the wiper opening 82 of the cowl top 8 to an outside of the first inlet passage R1. A wiper blade (not illustrated) which slidingly contacts on the windshield 93 is attached via a wiper link 10f and a wiper arm (not illustrated) on a top end of the wiper shaft 10b. The wiper device 10 is fixed on the upper surface of the damper housing support 5, an inner surface of the windshield lower 6 and the like via a bracket (not illustrated).

As illustrated in FIG. 18, a cut-out section 21a is formed at a lower part of a rear end of the side extension 2. The cut-out section 21a communicates with the first drain H1 and the second drain H2. Thus, the water flowing from the first drain H1 and the second drain H2 is drained to the side section of the vehicle V through the cut-out section 21a.

The vehicle front structure 110 according to the second embodiment of the invention is basically structured as described above. Next, the effects thereof will be explained.

According to the second embodiment, almost the same effects as the first embodiment can be achieved.

Further, according to the embodiment, the vertical wall section 53 extends linearly from the inside of the damper housing fixed section 51 in the vehicle width direction toward the central side of the cross member 7 in the vehicle width direction, and inclines to position inside in the vehicle width direction as extending backward from the front. Therefore, the load applied on the upper part of the damper housing 4 in the front-back direction and the right-left direction at a time of driving and turning is transmitted to the cross member 7 via the vertical wall section 53. This leads to higher support rigidity of the damper housing 4 and improves the operation stability.

According to the embodiment, since the approximately L-shaped cross section is formed by the vertical wall section 53 and the bottom wall section 52b, rigidity of the damper housing support 5 which couples the damper housing 4 and the central side of the cross member 7 in the vehicle width direction can be enhanced, resulting in the higher support rigidity of the damper housing 4.

According to the embodiment, since both the ends of the windshield lower 6 in the vehicle width direction are fixed on the upper member 1, respectively, torsional rigidity of the windshield lower 6 can be improved.

For example, JPS6430888A discloses a structure in which vehicle torsional rigidity is decreased due to an open cross section where a cowl opens forward. On the other hand, in the embodiment, the central closed section K1 extending in the vehicle width direction is formed by the windshield lower 6 and the cross member 7, and the end closed section K2 extending in the vehicle width direction is formed by the reinforcement member 9, the cross member 7 and the windshield lower 6. Therefore, the vehicle torsional rigidity can be improved compared with the structure disclosed in JPS6430888A.

Further, in JPS6430888A, an air intake box having an outside air introduction port is provided on a right damper housing, a space section communicating with the air intake box is formed at a right end part of the cowl, and a wiper motor is attached at a left end part of the cowl via an auxiliary plate. Therefore, the structure is such that the outside air is introduced from only the right end part of the cowl and the outside air cannot be introduced from the left end part of the cowl. On the other hand, in the embodiment, the first inlet passage R1 is provided both the right and left sides of the vehicle V respectively, and the second inlet passage R2 communicating with the first inlet passage R1 at both the right and left sides is provided to introduce the outside air from both the right and left sides of the vehicle V. Therefore, outside air introduction amount can be increased compared with the structure disclosed in JPS6430888A.

According to the embodiment, since the first inlet passage R1 is formed above the damper housing support 5, no member projecting to the engine room ER side is provided at the central side of the cross member 7 in the vehicle width direction. Thus, the engine hood 95 can be positioned lower, resulting in improvement of visibility at the front of the vehicle.

According to the embodiment, since the wiper device 10 is arranged in the first inlet passage R1, the water flowing in the first inlet passage R1 hits on the wiper device 10 while the outside air flows to circumvent the wiper device 10. Therefore, in-flow water to the blower B can be restrained and a decline of the outside air introduction amount can be prevented.

According to the embodiment, since the opening for operation 83 and the damper attachment lid 84 which is detachably attached on the opening for operation 83 are provided at both end parts of the cowl top 8 in the vehicle width direction, the removing/attaching operation for the damper and the maintenance operation can be performed easily by taking off the damper attachment lid 84 from the cowl top 8.

Further, since the outside air introduction bore 85 is formed in the damper attachment lid 84, the outside air is introduced from the outside air introduction bore 85 in addition to the outside air introduction port 81. Therefore, the outside air introduction amount can be increased.

According to the embodiment, since the first inlet passage R1 is formed by the cowl top 8, the damper housing support 5, the windshield lower 6, the reinforcement member 9, the covering member S and the upper member 1, front-back length of the first inlet passage R1 can be elongated and a width size of the first inlet passage R1 can be broadened. Thus, the in-flow water from the outside air introduction port 81 of the cowl top 8 drops on the damper housing support 5 and the cross member 7 to be drained on the way to the first inlet passage R1. Therefore, the gas-liquid separation is improved and power consumption of the blower B (air conditioner) can be reduced by keeping the outside air introduction amount sufficiently.

According to the embodiment, since the first drain H1 extending in the vehicle width direction is formed by the side wall section 52, the vertical wall section 53 of the damper housing support 5 and the front side vertical wall section 77 of the cross member 7, the water (such as rain or the water at a time of car washing) can be drained outside the vehicle.

According to the embodiment, since the damper housing support 5 and the cross member 7 are disposed under the wiper device 10, the water hit on the wiper device 10 is drained outside the vehicle via the damper housing support 5 and the cross member 7.

According to the embodiment, the side wall section 76 of the cross member 7 has the runoff 76a which projects upward at the corresponding position to the brake master cylinder 97 in the up-down direction. Therefore, the cross member 7 can be arranged downward to bring close to the brake master cylinder 97 compared with the side wall section 76 formed flat, and the engine hood 95 can be positioned lower accordingly.

Further, the side wall section 76 of the cross member 7 has the right and left pair of the inclined planes 76b which incline so as to position downward as extending from both the right and left sides of the runoff 76a to the outside in the vehicle width direction. Therefore, the water on the side wall section 76 of the cross member 7 is easily drained to the side section of the vehicle V by self-weight.

According to the embodiment, the bulged section 67 which bulges upward with respect to the center in the vehicle width direction is formed on both the ends of the windshield lower 6 in the vehicle width direction, respectively. The reinforcement member 9 is disposed between the bulged section 67 of the windshield lower 6 and the cross member 7. Therefore, an arrangement space for the wiper device 10 can be reserved between the bulged section 67 of the windshield lower 6 and the reinforcement member 9.

According to the embodiment, the lower flange section 74 of the cross member 7 is sandwiched in the up-down direction between the flange section 92a of the dashboard lower 92 and the flange section 64 of the windshield lower 6, and is fixed by the fixing manner such as welding. Therefore, the cross member 7 does not have a portion projecting backward with respect to the dashboard lower 92. Thus, the air conditioner and the like can be arranged in front of the compartment CR, the compartment CR can be expanded, and the windshield lower 6 can be positioned lower. Consequently, an arrangement space for a defroster nozzle which has an optimum shape for satisfactory defrosting performance can be reserved.

EXPLANATION OF REFERENCES

V vehicle
100, 110 vehicle front structure
1 upper member
2 side extension
3 side member
4 damper housing
41 upper surface
5 damper housing support
51 damper housing fixed section
52 side wall section
52a slope section (front wall section)
52b bottom wall section
53 vertical wall section
6 windshield lower
64 flange section (second flange section)
65 vertical wall section (rear wall section)
66 side wall section (windshield support section)
67 bulged section
7 cross member
74 lower flange section (third flange section)
76 side wall section (bottom wall section)
76a runoff
76b inclined plane
8 cowl top
81 outside air introduction port
83 opening for operation (first opening)
84 damper attachment lid
85 outside air introduction bore (second opening)
9 reinforcement member
10 wiper device
S covering member
S1 outer lid member
S2 inner lid member
S3 sealing material
91 front pillar
92 dashboard lower
92a flange section (first flange section)
93 windshield
95 engine hood
96 opening
97 brake master cylinder
ER engine room
CR compartment
K closed section
K1 central closed section
K2 end closed section
C gap
R1 first inlet passage (outside air introduction passage)
R2 second inlet passage
H drain
H1 first drain
H2 second drain The invention clamed is:
1. A vehicle front structure comprising:
a windshield lower that supports a windshield from underneath;
a cross member that is fixed on the windshield lower and extends in a vehicle width direction;
an upper member that is fixed on a front end part of a front pillar and extends in a front-back direction of a vehicle;
a damper housing that is fixed inside the upper member in the vehicle width direction and is arranged in front of the cross member to attach a damper; and
a damper housing support that couples the cross member with the damper housing, wherein
the windshield lower and the cross member form a closed section that extends in the vehicle width direction, and
the damper housing support has:
a damper housing fixed section that is fixed on an upper surface of the damper housing;
the side wall section having a front wall section that extends downward and backward from a rear end part of the damper housing fixed section and extends along a rear end part of the damper housing, and a bottom wall section that continues to the front wall section and inclines to position downward as extending outside in the vehicle width direction to be fixed on the cross member; and
a vertical wall section that extends backward from an inside of the damper housing fixed section in the vehicle width direction and continues to an inside of the side wall section in the vehicle width direction to be fixed on the cross member,
the side wall section, the vertical wall section and the cross member form a drain that extends outside in the vehicle width direction from the vertical wall section,
the vertical wall section is fixed outside the cross member in the vehicle width direction and functions as a cutoff section that prevents in-flow water in the drain from flowing inside in the vehicle width direction,
the vertical wall section and the bottom wall section form an approximately L-shaped cross section that extends linearly from the damper housing fixed section to the cross member,
the cross member has an outside air inlet port through which outside air passes behind the damper housing support,
the windshield lower has a blower inlet port that is coupled with a blower, and
an outside air introduction passage that extends in the front-back direction to introduce the outside air is formed above the damper housing support.

2. A vehicle front structure comprising:
a windshield lower that supports a windshield from underneath;
a cross member that is fixed on the windshield lower and extends in a vehicle width direction;
an upper member that is fixed on a front end part of a front pillar and extends in a front-back direction of a vehicle;
a damper housing that is fixed inside the upper member in the vehicle width direction and is arranged in front of the cross member to attach a damper; and
a damper housing support that couples the cross member with the damper housing, wherein
the windshield lower and the cross member form a closed section,
the damper housing support has:
a damper housing fixed section that is fixed on an upper surface of the damper housing; and
a vertical wall section that extends backward from an inside of the damper housing fixed section in the vehicle width direction and is fixed on the cross member,
the damper housing support is arranged at both right and left side,
a right and left pair of outside air introduction passages that extend in the front-back direction to introduce outside air are formed above the damper housing support, and
the closed section lets the right and left pair of outside introduction passages communicate.

3. A vehicle front structure comprising:
a windshield lower that supports a windshield from underneath;
a cross member that is fixed on the windshield lower and extends in a vehicle width direction;
an upper member that is fixed on a front end part of a front pillar and extends in a front-back direction of a vehicle;
a damper housing that is fixed inside the upper member in the vehicle width direction and is arranged in front of the cross member to attach a damper; and
a damper housing support that couples the cross member with the damper housing, wherein
the windshield lower and the cross member form a closed section,
the damper housing support has:
a damper housing fixed section that is fixed on an upper surface of the damper housing; and
a vertical wall section that extends backward from an inside of the damper housing fixed section in the vehicle width direction and is fixed on the cross member,
a bulged section that bulges upward with respect to a center in the vehicle width direction is formed at both ends of the windshield lower in the vehicle width direction,
a right and left pair of reinforcement members are further provided, which are provided at both ends of the cross member in the vehicle width direction and are arranged between the bulged section of the windshield lower and the cross member,
the cross member and the windshield lower form a central closed section that extends at a central side in the vehicle width direction,
the cross member, the reinforcement member and the bulged section of the windshield lower form an end closed section that extends at both end sides in the vehicle width direction; and
the central closed section and the end closed section communicate to each other.

4. The vehicle front structure according to claim 2, wherein
a front end side of the windshield lower positions above the damper housing support,
a cowl top is further provided, which is arranged above the damper housing support to cover an opening formed between the windshield lower and an engine hood, and which has an outside air introduction port through which the outside air is introduced,
a covering member is further provided, which seals between the damper housing support, the windshield lower and the cowl top, and
the cowl top, the damper housing support, the windshield lower, the covering member and the upper member form the outside air introduction passages.

5. The vehicle front structure according to claim 4, wherein
the cowl top has a first opening that is provided at both ends in the vehicle width direction and faces an upper surface of the damper housing and a damper attachment lid that closes the first opening and is detachably provided on the first opening, and
the damper attachment lid has a second opening that faces the upper surface of the damper housing.

6. The vehicle front structure according to claim 2, wherein a wiper device is arranged in the outside air introduction passages.

7. The vehicle front structure according to claim 6, wherein the damper housing support and the cross member are arranged under the wiper device.

8. The vehicle front structure according to claim 1, wherein
the vertical wall section extends linearly from the inside of the damper housing fixed section in the vehicle width direction to the cross member and inclines to position at the inside in the vehicle width direction as extending backward from a front.

9. The vehicle front structure according to claim 2 further having a dashboard lower that separates an engine room from a compartment, wherein
the windshield lower is fixed on an upper end part of the dashboard lower and extends forward from the upper end part of the dashboard lower to support the windshield in a cantilever structure,
the cross member is fixed on the dashboard lower side of the windshield lower,
a brake master cylinder is attached in the dashboard lower,
the cross member has a bottom wall section and is arranged above the brake master cylinder, and
the bottom wall section has a runoff that projects upward at a corresponding position to the brake master cylinder in an up-down direction, and a right and left pair of inclined planes that incline to position downward as extending from the runoff to an outside in the vehicle width direction.

* * * * *